United States Patent
Watanabe et al.

(10) Patent No.: US 11,628,611 B2
(45) Date of Patent: Apr. 18, 2023

(54) MOLDED FOAM

(71) Applicant: Kyoraku Co., Ltd., Kyoto (JP)

(72) Inventors: Akihiko Watanabe, Yamato (JP); Masaaki Onodera, Yamato (JP)

(73) Assignee: Kyoraku Co., Ltd., Kyoto (JP)

( * ) Notice: Subject to any disclaimer, the term of this patent is extended or adjusted under 35 U.S.C. 154(b) by 57 days.

(21) Appl. No.: 17/336,752

(22) Filed: Jun. 2, 2021

(65) Prior Publication Data

US 2021/0283819 A1    Sep. 16, 2021

Related U.S. Application Data

(62) Division of application No. 15/312,385, filed as application No. PCT/JP2015/063196 on May 7, 2015, now Pat. No. 11,052,594.

(30) Foreign Application Priority Data

May 23, 2014 (JP) ................................ 2014-106804

(51) Int. Cl.
  *B29B 11/10* (2006.01)
  *B29C 49/00* (2006.01)
  (Continued)

(52) U.S. Cl.
  CPC .............. *B29C 49/04* (2013.01); *B29B 11/10* (2013.01); *B29C 49/0005* (2013.01);
  (Continued)

(58) Field of Classification Search
  CPC ............ B60H 1/00557; B60H 1/00564; B60H 1/00571; B29C 49/04; B29C 49/06914;
  (Continued)

(56) References Cited

U.S. PATENT DOCUMENTS

| 4,874,649 A | * | 10/1989 | Daubenbuchel | ........ B29C 49/22 264/DIG. 1 |
|---|---|---|---|---|
| 2007/0006986 A1 | * | 1/2007 | Derleth | ................ B62D 25/142 162/234 |

(Continued)

FOREIGN PATENT DOCUMENTS

| JP | 2000085336 A | 3/2000 |
|---|---|---|
| JP | 2003039536 A | 2/2003 |

(Continued)

OTHER PUBLICATIONS

International Search Report dated Aug. 11, 2015 issued in corresponding PCT Application No. PCT/JP2015/063196.
Extended European Search Report dated Nov. 21, 2017 for the corresponding European Patent Application No. 15795981.8.

*Primary Examiner* — Michael C Romanowski
(74) *Attorney, Agent, or Firm* — Maier & Maier, PLLC

(57) ABSTRACT

The present invention relates to molded foam having no hollow space caused in a plate-shaped portion. The molded foam comprises a tube body and a plate-shaped portion joined to the outer side of the tube body. The expansion ratio of the molded foam is lower than two, and a value of a thickness B/a thickness A as a relationship between the thickness A of the tube body at the periphery of a point joined to the plate-shaped portion and the thickness B of the plate-shaped portion is less than 2.82.

1 Claim, 17 Drawing Sheets

(51) Int. Cl.
*B29C 49/04* (2006.01)
*B29K 105/04* (2006.01)
*B60H 1/00* (2006.01)
*B29C 49/60* (2006.01)
*B29C 49/02* (2006.01)
*B29K 23/00* (2006.01)
*B29L 23/00* (2006.01)
*B29L 31/30* (2006.01)

(52) U.S. Cl.
CPC ........ *B29C 49/06914* (2022.05); *B29C 49/60* (2013.01); *B29C 2049/609* (2013.01); *B29C 2049/6072* (2013.01); *B29K 2023/12* (2013.01); *B29K 2105/04* (2013.01); *B29K 2105/046* (2013.01); *B29L 2023/00* (2013.01); *B29L 2031/3032* (2013.01); *B60H 1/00564* (2013.01)

(58) Field of Classification Search
CPC ............... B29B 11/10; B29L 2023/005; B29L 2023/00; B29L 2031/3032; B29K 2023/10–14; B29K 2023/12; B29K 2105/04
USPC ........................ 428/34.1–36.92; 454/69–165
See application file for complete search history.

(56) References Cited

U.S. PATENT DOCUMENTS

| | | | |
|---|---|---|---|
| 2007/0031622 A1* | 2/2007 | Imanari | B29C 49/0005 428/36.5 |
| 2008/0261016 A1* | 10/2008 | Tamada | C08L 23/12 428/314.2 |
| 2008/0308674 A1* | 12/2008 | Frantz | B29C 53/38 138/128 |
| 2012/0135173 A1* | 5/2012 | Tsuchida | C08L 23/12 428/36.5 |
| 2013/0052377 A1* | 2/2013 | Tani | B29C 48/39 428/34.1 |
| 2013/0255820 A1* | 10/2013 | Cacciacarro | B32B 3/263 138/141 |
| 2013/0276959 A1 | 10/2013 | Frantz et al. | |
| 2016/0102786 A1* | 4/2016 | Iwasaki | B60H 1/00564 181/224 |

FOREIGN PATENT DOCUMENTS

| | | |
|---|---|---|
| JP | 2011131776 A | 7/2011 |
| JP | 2013063639 A | 4/2013 |

* cited by examiner

FIG. 16

| SAMPLE No. | WEIGHT (g) | SPECIFIC GRAVITY | FLANGE SIDE THICKNESS (mm) (A) | FLANGE THICKNESS (mm) (B) | FLANGE THICKNESS/ FLANGE SIDE THICKNESS (C) | DETERMINATION |
|---|---|---|---|---|---|---|
| 1 | 180 | 0.55 | 1.53 | 3.01 | 1.97 | OK |
| 2 | 176 | 0.56 | 1.61 | 3.05 | 1.89 | OK |
| 3 | 187 | 0.57 | 1.71 | 3.03 | 1.77 | OK |
| 4 | 204 | 0.59 | 1.78 | 3.04 | 1.71 | OK |
| 5 | 190 | 0.53 | 1.81 | 3.02 | 1.67 | OK |
| 6 | 189 | 0.58 | 1.86 | 3.03 | 1.63 | OK |
| 7 | 230 | 0.58 | 1.91 | 3.03 | 1.59 | OK |
| 8 | 195 | 0.50 | 1.92 | 3.01 | 1.57 | OK |
| 9 | 228 | 0.57 | 1.96 | 3.05 | 1.56 | OK |
| 10 | 208 | 0.56 | 2.02 | 3.04 | 1.50 | OK |
| 11 | 230 | 0.55 | 2.05 | 3.04 | 1.48 | OK |
| 12 | 245 | 0.58 | 2.10 | 3.01 | 1.43 | OK |
| 13 | 242 | 0.58 | 2.13 | 3.04 | 1.43 | OK |
| 14 | 277 | 0.58 | 2.15 | 3.02 | 1.40 | BAD1 |
| 15 | 229 | 0.58 | 2.16 | 3.03 | 1.40 | OK |
| 16 | 280 | 0.59 | 2.20 | 3.03 | 1.38 | BAD1 |
| 17 | 215 | 0.52 | 2.20 | 3.03 | 1.38 | OK |
| 18 | 245 | 0.57 | 2.21 | 3.02 | 1.37 | OK |
| 19 | 260 | 0.58 | 2.23 | 3.04 | 1.36 | BAD1 |
| 20 | 280 | 0.58 | 2.23 | 3.01 | 1.35 | BAD1 |
| 21 | 221 | 0.52 | 2.25 | 3.03 | 1.35 | OK |
| 22 | 272 | 0.60 | 2.27 | 3.02 | 1.33 | BAD1 |
| 23 | 277 | 0.58 | 2.35 | 3.05 | 1.30 | BAD1 |
| 24 | 234 | 0.56 | 2.33 | 3.02 | 1.30 | OK |
| 25 | 266 | 0.59 | 2.34 | 3.03 | 1.29 | BAD1 |
| 26 | 278 | 0.58 | 2.34 | 3.02 | 1.29 | BAD1 |
| 27 | 286 | 0.57 | 2.34 | 3.00 | 1.28 | NG1 |
| 28 | 230 | 0.54 | 2.37 | 3.02 | 1.27 | OK |
| 29 | 287 | 0.58 | 2.39 | 3.00 | 1.26 | BAD1 |
| 30 | 279 | 0.59 | 2.42 | 3.02 | 1.25 | OK |
| 31 | 276 | 0.58 | 2.44 | 3.03 | 1.24 | BAD1 |
| 32 | 283 | 0.57 | 2.44 | 3.03 | 1.24 | BAD1 |
| 33 | 287 | 0.57 | 2.44 | 3.02 | 1.24 | BAD1 |
| 34 | 259 | 0.57 | 2.44 | 3.02 | 1.24 | BAD1 |
| 35 | 287 | 0.58 | 2.46 | 3.04 | 1.24 | NG1 |
| 36 | 285 | 0.58 | 2.52 | 3.03 | 1.20 | BAD1 |
| 37 | 290 | 0.58 | 2.52 | 3.01 | 1.19 | BAD1 |
| 38 | 291 | 0.57 | 2.56 | 3.01 | 1.18 | BAD1 |
| 39 | 287 | 0.57 | 2.58 | 3.01 | 1.17 | BAD1 |
| 40 | 284 | 0.55 | 2.63 | 3.02 | 1.15 | BAD1 |
| 41 | 287 | 0.57 | 2.69 | 3.01 | 1.12 | BAD1 |
| 42 | 286 | 0.57 | 2.76 | 3.03 | 1.10 | BAD1 |

FIG. 17

| SAMPLE No. | WEIGHT (g) | SPECIFIC GRAVITY | FLANGE SIDE THICKNESS (mm) (A) | FLANGE THICKNESS (mm) (B) | FLANGE THICKNESS/ FLANGE SIDE THICKNESS (C) | DETERMINATION |
|---|---|---|---|---|---|---|
| 1 | 176 | 0.57 | 1.30 | 4.40 | 3.38 | NG2 |
| 2 | 178 | 0.56 | 1.40 | 4.41 | 3.15 | NG2 |
| 3 | 176 | 0.56 | 1.42 | 4.42 | 3.11 | NG2 |
| 4 | 195 | 0.50 | 1.47 | 4.40 | 2.99 | OK |
| 5 | 180 | 0.55 | 1.50 | 4.42 | 2.95 | OK |
| 6 | 193 | 0.57 | 1.53 | 4.40 | 2.88 | NG3 |
| 7 | 187 | 0.57 | 1.53 | 4.38 | 2.86 | OK |
| 8 | 195 | 0.57 | 1.55 | 4.40 | 2.84 | NG2 |
| 9 | 189 | 0.58 | 1.54 | 4.35 | 2.82 | NG3 |
| 10 | 193 | 0.50 | 1.58 | 4.38 | 2.77 | OK |
| 11 | 190 | 0.53 | 1.58 | 4.35 | 2.75 | OK |
| 12 | 207 | 0.58 | 1.65 | 4.40 | 2.67 | OK |
| 13 | 210 | 0.58 | 1.63 | 4.34 | 2.66 | OK |
| 14 | 221 | 0.52 | 1.67 | 4.38 | 2.62 | OK |
| 15 | 226 | 0.58 | 1.68 | 4.40 | 2.62 | OK |
| 16 | 208 | 0.56 | 1.69 | 4.42 | 2.62 | OK |
| 17 | 204 | 0.59 | 1.69 | 4.39 | 2.60 | OK |
| 18 | 215 | 0.57 | 1.71 | 4.40 | 2.57 | OK |
| 19 | 209 | 0.56 | 1.70 | 4.37 | 2.57 | OK |
| 20 | 215 | 0.57 | 1.72 | 4.38 | 2.55 | OK |
| 21 | 203 | 0.57 | 1.73 | 4.37 | 2.53 | OK |
| 22 | 214 | 0.57 | 1.74 | 4.39 | 2.52 | OK |
| 23 | 205 | 0.51 | 1.75 | 4.39 | 2.51 | OK |
| 24 | 230 | 0.58 | 1.79 | 4.37 | 2.44 | OK |
| 25 | 239 | 0.56 | 1.81 | 4.39 | 2.43 | OK |
| 26 | 228 | 0.57 | 1.83 | 4.43 | 2.42 | OK |
| 27 | 231 | 0.56 | 1.83 | 4.40 | 2.40 | OK |
| 28 | 201 | 0.52 | 1.83 | 4.38 | 2.39 | OK |
| 29 | 221 | 0.58 | 1.83 | 4.37 | 2.39 | OK |
| 30 | 240 | 0.59 | 1.85 | 4.41 | 2.38 | OK |
| 31 | 230 | 0.54 | 1.89 | 4.39 | 2.32 | OK |
| 32 | 242 | 0.58 | 1.94 | 4.37 | 2.25 | OK |
| 33 | 215 | 0.52 | 1.92 | 4.32 | 2.25 | OK |
| 34 | 213 | 0.53 | 2.01 | 4.46 | 2.22 | OK |
| 35 | 229 | 0.58 | 2.02 | 4.45 | 2.20 | OK |
| 36 | 245 | 0.58 | 2.04 | 4.47 | 2.19 | OK |
| 37 | 242 | 0.57 | 2.02 | 4.42 | 2.19 | OK |
| 38 | 230 | 0.55 | 2.02 | 4.37 | 2.16 | OK |
| 39 | 234 | 0.56 | 2.04 | 4.40 | 2.16 | OK |
| 40 | 241 | 0.58 | 2.18 | 4.40 | 2.02 | OK |
| 41 | 245 | 0.57 | 2.23 | 4.40 | 1.97 | OK |
| 42 | 260 | 0.58 | 2.26 | 4.40 | 1.95 | OK |
| 43 | 266 | 0.59 | 2.32 | 4.39 | 1.89 | OK |
| 44 | 263 | 0.57 | 2.37 | 4.43 | 1.87 | OK |
| 45 | 280 | 0.59 | 2.38 | 4.42 | 1.86 | OK |
| 46 | 287 | 0.57 | 2.53 | 4.41 | 1.74 | OK |
| 47 | 284 | 0.55 | 2.81 | 4.36 | 1.55 | OK |

FIG. 18

| SAMPLE No. | WEIGHT (g) | SPECIFIC GRAVITY | FLANGE SIDE THICKNESS (mm) (A) | FLANGE THICKNESS (mm) (B) | FLANGE THICKNESS/ FLANGE SIDE THICKNESS (C) | DETERMINATION |
|---|---|---|---|---|---|---|
| 1 | 101 | 0.36 | 1.13 | 2.86 | 2.53 | OK |
| 2 | 116 | 0.36 | 1.32 | 2.87 | 2.17 | OK |
| 3 | 133 | 0.37 | 1.47 | 2.86 | 1.95 | OK |
| 4 | 149 | 0.38 | 1.52 | 2.91 | 1.91 | OK |
| 5 | 135 | 0.37 | 1.55 | 2.89 | 1.86 | OK |
| 6 | 157 | 0.36 | 1.70 | 2.83 | 1.66 | OK |
| 7 | 165 | 0.36 | 1.87 | 2.84 | 1.52 | OK |
| 8 | 186 | 0.38 | 1.96 | 2.92 | 1.49 | OK |
| 9 | 172 | 0.36 | 1.94 | 2.88 | 1.48 | OK |
| 10 | 184 | 0.32 | 1.99 | 2.92 | 1.47 | OK |
| 11 | 175 | 0.37 | 2.00 | 2.91 | 1.46 | BAD1 |
| 12 | 195 | 0.34 | 2.07 | 2.89 | 1.40 | OK |
| 13 | 191 | 0.37 | 2.10 | 2.91 | 1.39 | BAD1 |
| 14 | 201 | 0.36 | 2.19 | 2.89 | 1.32 | BAD1 |
| 15 | 197 | 0.36 | 2.20 | 2.90 | 1.32 | BAD1 |
| 16 | 196 | 0.36 | 2.22 | 2.90 | 1.31 | BAD1 |
| 17 | 186 | 0.35 | 2.23 | 2.91 | 1.30 | OK |
| 18 | 196 | 0.35 | 2.23 | 2.89 | 1.30 | BAD1 |
| 19 | 205 | 0.34 | 2.23 | 2.89 | 1.30 | BAD1 |
| 20 | 191 | 0.30 | 2.25 | 2.84 | 1.26 | OK |
| 21 | 194 | 0.31 | 2.34 | 2.95 | 1.26 | OK |
| 22 | 198 | 0.34 | 2.33 | 2.93 | 1.26 | BAD1 |
| 23 | 206 | 0.35 | 2.35 | 2.91 | 1.24 | NG1 |
| 24 | 200 | 0.37 | 2.38 | 2.92 | 1.23 | OK |
| 25 | 203 | 0.35 | 2.35 | 2.88 | 1.23 | BAD1 |
| 26 | 209 | 0.32 | 2.37 | 2.87 | 1.21 | BAD1 |
| 27 | 208 | 0.30 | 2.42 | 2.91 | 1.20 | BAD1 |
| 28 | 221 | 0.36 | 2.44 | 2.91 | 1.19 | BAD1 |
| 29 | 216 | 0.33 | 2.47 | 2.92 | 1.18 | BAD1 |
| 30 | 178 | 0.31 | 2.47 | 2.84 | 1.15 | BAD1 |
| 31 | 223 | 0.36 | 2.76 | 2.90 | 1.05 | NG1 |
| 32 | 213 | 0.35 | 2.88 | 2.90 | 1.01 | BAD1 |

FIG. 19

| SAMPLE No. | WEIGHT (g) | SPECIFIC GRAVITY | FLANGE SIDE THICKNESS (mm) (A) | FLANGE THICKNESS (mm) (B) | FLANGE THICKNESS/ FLANGE SIDE THICKNESS (C) | DETERMINATION |
|---|---|---|---|---|---|---|
| 1 | 115 | 0.35 | 1.23 | 4.34 | 3.53 | NG2 |
| 2 | 123 | 0.36 | 1.31 | 4.40 | 3.36 | NG2 |
| 3 | 111 | 0.36 | 1.25 | 4.17 | 3.34 | NG2 |
| 4 | 121 | 0.35 | 1.33 | 4.41 | 3.32 | NG2 |
| 5 | 116 | 0.38 | 1.28 | 4.21 | 3.29 | NG3 |
| 6 | 119 | 0.36 | 1.33 | 4.37 | 3.29 | NG2 |
| 7 | 101 | 0.36 | 1.27 | 4.12 | 3.24 | NG2 |
| 8 | 118 | 0.37 | 1.45 | 4.48 | 3.09 | NG3 |
| 9 | 108 | 0.35 | 1.36 | 4.19 | 3.08 | NG2 |
| 10 | 127 | 0.35 | 1.43 | 4.37 | 3.06 | OK |
| 11 | 121 | 0.35 | 1.43 | 4.30 | 3.01 | NG2 |
| 12 | 138 | 0.34 | 1.47 | 4.37 | 2.97 | OK |
| 13 | 125 | 0.34 | 1.51 | 4.39 | 2.91 | OK |
| 14 | 121 | 0.34 | 1.49 | 4.29 | 2.88 | NG2 |
| 15 | 127 | 0.36 | 1.56 | 4.41 | 2.83 | OK |
| 16 | 131 | 0.33 | 1.56 | 4.40 | 2.82 | OK |
| 17 | 158 | 0.34 | 1.58 | 4.40 | 2.78 | OK |
| 18 | 149 | 0.37 | 1.53 | 4.23 | 2.76 | OK |
| 19 | 141 | 0.36 | 1.60 | 4.38 | 2.74 | OK |
| 20 | 138 | 0.40 | 1.65 | 4.38 | 2.65 | OK |
| 21 | 144 | 0.33 | 1.67 | 4.34 | 2.60 | OK |
| 22 | 163 | 0.34 | 1.74 | 4.33 | 2.49 | OK |
| 23 | 133 | 0.37 | 1.62 | 4.02 | 2.48 | OK |
| 24 | 138 | 0.34 | 1.78 | 4.39 | 2.47 | OK |
| 25 | 135 | 0.37 | 1.73 | 4.02 | 2.32 | OK |
| 26 | 151 | 0.34 | 1.84 | 3.91 | 2.13 | OK |
| 27 | 157 | 0.36 | 1.96 | 4.15 | 2.12 | OK |
| 28 | 158 | 0.33 | 2.21 | 4.20 | 1.90 | OK |

MOLDED FOAM

CROSS-REFERENCE TO RELATED APPLICATIONS

This is a divisional application of U.S. patent application Ser. No. 15/312,385, filed Nov. 18, 2016, which is U.S. national phase application under 35 U.S.C. § 371 of International Patent Application No. PCT/JP2015/063196, filed on May 7, 2015, and claims benefit of priority to Japanese Patent Application No. 2014-106804, filed May 23, 2014. The entire contents of these applications are hereby incorporated by reference.

TECHNICAL FIELD

The present invention relates to molded foam molded of foamed resin in a molten state. Particularly, the present invention relates to molded foam including a plate-shaped portion connected to a tube body, such as a flange portion for connection with other members.

BACKGROUND

For ducts etc., molded foam including a plate-shaped portion joined to a tube body, such as a flange portion has been broadly used (see, e.g., JP-A-2013-63639, "JP '639").

Particularly for a duct for ventilation of air from an air conditioner, molded foam in the form of tube can be used to realize a lightweight duct exhibiting excellent thermal insulating properties. Further, improvement of the thermal insulating properties of such a duct and weight reduction of such a duct can be realized in such a manner that many cells in the foam are formed by an expansion ratio increase in molding. Thus, such a duct is more effective.

The molded foam in the form of a tube is, as illustrated in FIG. 1, molded in such a manner that foamed resin 200 in a molten state is clamped with a predetermined pressing force Z by split mold blocks 201a, 201b. A portion to be a tube body X8 is obtained in such a manner that the foamed resin 200 in the molten state is pressed into cavities 202a, 202b with a predetermined blow pressure. Moreover, a portion to be a plate-shaped portion Y8 such as a flange portion is obtained in such a manner that the foamed resin 200 in the molten state is pressed with the predetermined pressing force Z in the thickness direction of the plate-shaped portion Y8, and then, is further compressed to a thickness T between the cavities 202a, 202b of the split mold blocks 201a, 201b.

As illustrated in FIG. 1, in the case where the plate-shaped portion Y8 such as the flange portion is joined to the tube body X8 such as a duct, a predetermined structural strength is often required for reliable connection between the plate-shaped portion Y8 and another member. For this reason, in clamping by the split mold blocks 201a, 201b, the plate-shaped portion Y8 is pressed, leading to crushing of cells in the foamed resin of the plate-shaped portion Y8.

The tube body X8 includes a hollow portion. Because of such a hollowed space, when the plate-shaped portion Y8 is extremely pressed, the cells in the foamed resin of the plate-shaped portion Y8 move, as illustrated in FIG. 2, toward the tube body X8 by the pressing force Z caused by clamping. As a result of clamping by the split mold blocks 201a, 201b, the cells move to a portion of the tube body X8 joined to the plate-shaped portion Y8. Many cells tend to be gathered in such a portion of the tube body X8. Due to such cells, a balloon-shaped cell 81 might be formed inside the tube body X8 joined to the plate-shaped portion Y8.

When the balloon-shaped cell 81 is caused, the inner shape of the tube body X8 becomes different from a designed shape. As a result, the flow efficiency of fluid passing through the inside of the tube body X8 is lowered. Moreover, noise or vibration is caused. The balloon-shaped cell 81 is caused even when an expansion ratio is low or high.

Note that in order not to cause the balloon-shaped cell 81 as illustrated in FIG. 2, the pressing force Z on the plate-shaped portion Y8 may be weakened in clamping by the split mold blocks 201a, 201b. Alternatively, the thickness T between the cavities 202a, 202b of the split mold blocks 201a, 201b as illustrated in FIG. 1 may be increased not to move the cells to the portion of the tube body X8 joined to the plate-shaped portion Y8.

However, weakening of the pressing force Z on the plate-shaped portion Y8 or an increase in the thickness T between the cavities 202a, 202b leads to the following problems. That is, as illustrated in FIG. 3, even when the foamed resin 200 in the molten state is compressed to weld portions of the foamed resin 200 forming the plate-shaped portion Y8, the portions of the foamed resin 200 forming the plate-shaped portion Y8 might not be welded together in a desired welding state. In this case, when blow molding is performed with a predetermined blow pressure in, e.g., the state illustrated in FIG. 3, an inner surface of a portion of the tube body X8 joined to the plate-shaped portion Y8 is torn apart by a blow pressure P as illustrated in FIG. 4. Then, a clearance 82 is formed between the portions of the foamed resin 200 to extend from an inner surface side of the tube body X8 toward the plate-shaped portion Y8. Note that the clearance 82 illustrated in FIG. 4 is also caused by molding contraction of the portions of the foamed resin 200 forming the plate-shaped portion Y8. When the clearance 82 is formed on the inner surface of the tube body X8 as illustrated in FIG. 4, the inner shape of the tube body X8 also becomes different from the designed shape as in the balloon-shaped cell 81 illustrated in FIG. 2. As a result, the flow efficiency of fluid passing through the inside of the tube body X8 is lowered. Moreover, noise or vibration is caused.

When the portions of the foamed resin 200 forming the plate-shaped portion Y8 are not welded in a desired welding state, a hollow space 83 might be formed between the portions of the foamed resin 200 forming the plate-shaped portion Y8 as illustrated in FIG. 5, for example. The hollow space 83 caused in the plate-shaped portion Y8 is formed with the portions of the foamed resin 200 being not welded together. Alternatively, the hollow space 83 is also formed when the portions of the foamed resin 200 are partially detached from each other after the portions of the foamed resin 200 have been temporarily welded together. Not only the balloon-shaped cell 81 illustrated in FIG. 2 but also the clearance 82 illustrated in FIG. 4 are not caused on the inner surface of the tube body X8 illustrated in FIG. 5. For this reason, there are no problems such as lowering of the flow efficiency of fluid passing through the inside of the tube body X8 and occurrence of noise or vibration. Note that the plate-shaped portion Y8 is a portion connected to another member. Thus, the plate-shaped portion Y8 is provided with a through-hole for insertion of a bolt etc., and is connected to another member in such a manner that the through-hole into which, e.g., the bolt is inserted is fastened with a nut. If the hollow space 83 is caused at a point where the through-hole is formed, the strength of the periphery of the through-hole is weakened, or rattling is caused when the plate-shaped portion Y8 is connected to another member. Problems such as lowering of the strength of the periphery of the through-hole and occurrence of rattling are also caused where the clearance 82 illustrated in FIG. 4 are caused. Note that for the hollow space 83 formed with the portions of the foamed resin 200 being not welded together, occurrence of such a hollow space 83 in the plate-shaped portion Y8 can be determined by pushing of the plate-shaped portion Y8 in production. However, for the hollow space 83 formed due to partial detachment of the portions of the foamed resin 200 after the portions of the foamed resin 200 have been temporarily welded together, occurrence of such a hollow space 83 in the plate-shaped portion Y8 is difficult to be determined even by pushing of the plate-shaped portion Y8 in production.

In the case where the balloon-shaped cell 81 illustrated in FIG. 2 or the clearance 82 illustrated in FIG. 4 is caused, defective molded foam in which the balloon-shaped cell 81 or the clearance 82 is caused can be removed by examination of the inner surface of the tube body X8.

However, the hollow space 83 illustrated in FIG. 5 is formed inside the plate-shaped portion Y8. For this reason, the hollow space 83 cannot be found even by examining the inner surface of the tube body X8. Thus, molded foam having no hollow space 83 in the plate-shaped portion Y8 illustrated in FIG. 5 needs to be molded.

Note that in order to avoid the shape problems illustrated in FIGS. 2, 4, and 5, there is a method for forming, between the portions of the plate-shaped portion Y8, a hollow portion 85 integrally communicating with a hollow portion 84 of the tube body X8 as illustrated in FIG. 6, for example. However, the hollow portion 85 is formed between the portions of the plate-shaped portion Y8 in the configuration illustrated in FIG. 6, it is difficult to provide the predetermined structural strength to the plate-shaped portion Y8. Moreover, the plate-shaped portion Y8 dents when the through-hole for insertion of the bolt etc. is formed at the plate-shaped portion Y8, and for this reason, it is difficult to form the through-hole. Further, the hollow portion 85 of the plate-shaped portion Y8 integrally communicates with the hollow portion 84 of the tube body X8. Thus, when the through-hole is formed at the plate-shaped portion Y8, air in the tube body X8 might be released through the through-hole.

For this reason, as illustrated in FIG. 1, the molded foam including the foamed resin 200 being welded each other in a desired welding state and the plate-shaped portion Y8 joined to the tube body X8 needs to be molded.

Note that as a method for preventing occurrence of the balloon-shaped cell 81 as illustrated in FIG. 2, occurrence of the balloon-shaped cell 81 is prevented in JP '639 in such a manner that a recessed portion is formed in the vicinity of a joint surface of the plate-shaped portion to the tube body to block movement of cells toward the tube body.

However, in the method of JP '639, the recessed portion needs to be formed in the vicinity of the joint surface between the plate-shaped portion and the tube body. Moreover, the method of JP '639 is intended to prevent occurrence of the balloon-shaped cell 81. In JP '639, prevention of occurrence of the clearance 82 illustrated in FIG. 4 and the hollow space 83 illustrated in FIG. 5 is not taken into consideration at all.

The present invention is intended to provide molded foam including a tube body and a plate-shaped portion joined to the outer side of the tube body and having no hollow space caused in the plate-shaped portion.

SUMMARY

Molded foam according to the present invention includes: a tube body; and a plate-shaped portion joined to an outer side of the tube body. An expansion ratio of the molded foam is lower than two. A value of a thickness B/a thickness A as a relationship between the thickness A of the tube body at a periphery of a point joined to the plate-shaped portion and the thickness B of the plate-shaped portion is less than 2.82.

Molded foam according to the present invention, moreover, includes: a tube body; and a plate-shaped portion joined to an outer side of the tube body. An expansion ratio of the molded foam is equal to or higher than two. A value of a thickness B/a thickness A as a relationship between the thickness A of the tube body at a periphery of a point joined to the plate-shaped portion and the thickness B of the plate-shaped portion is less than 2.88.

According to the present invention, the molded foam having no hollow space caused in the plate-shaped portion can be obtained.

BRIEF DESCRIPTION OF THE DRAWINGS

FIG. 16 is a first table of examination results of a first example.

FIG. 17 is a second table of the examination results of the first example.

FIG. 18 is a first table of examination results of a second example.

FIG. 19 is a second table of the examination results of the second example.

DETAILED DESCRIPTION (Summary of Molded Foam 1 of Embodiment of the Present Invention)

Figure 7:
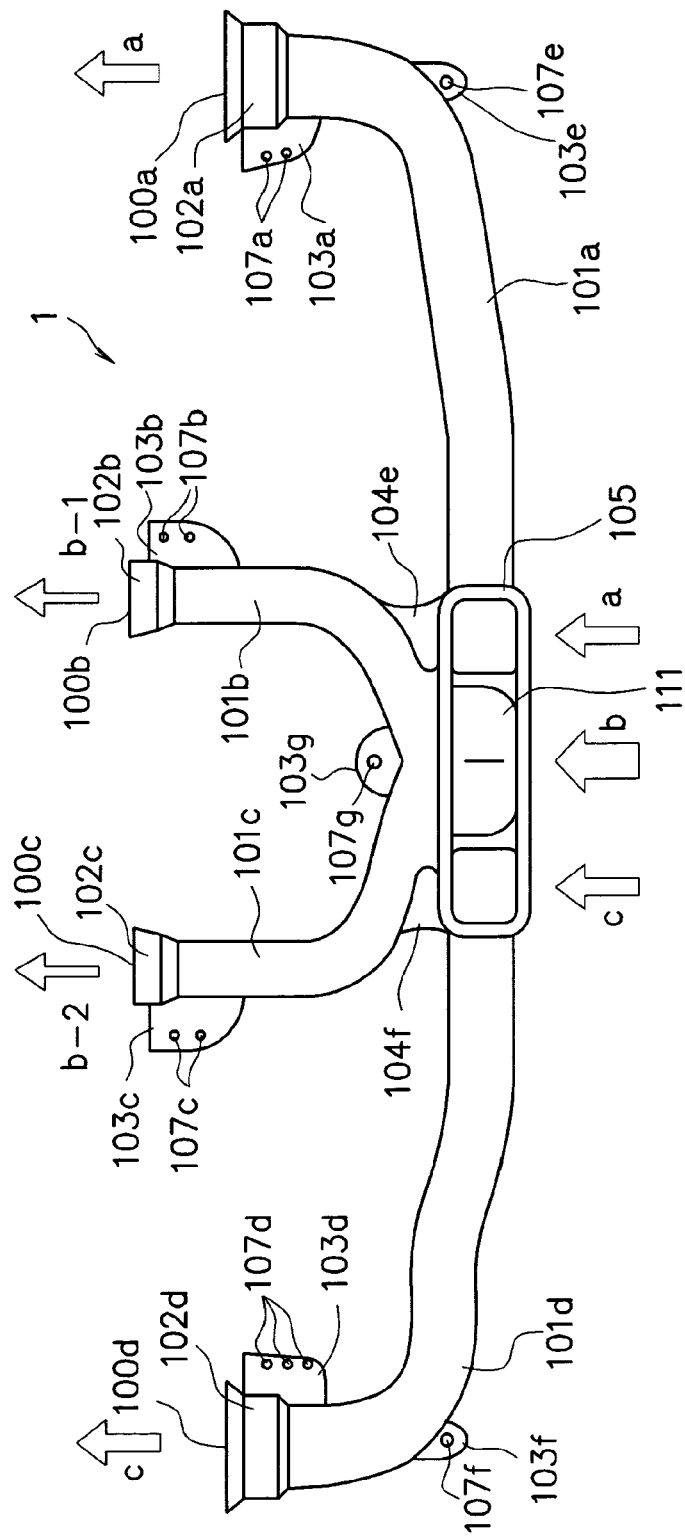
FIG. 7 is a plan view of an instrument panel duct 1 of an embodiment.
Figure 8:
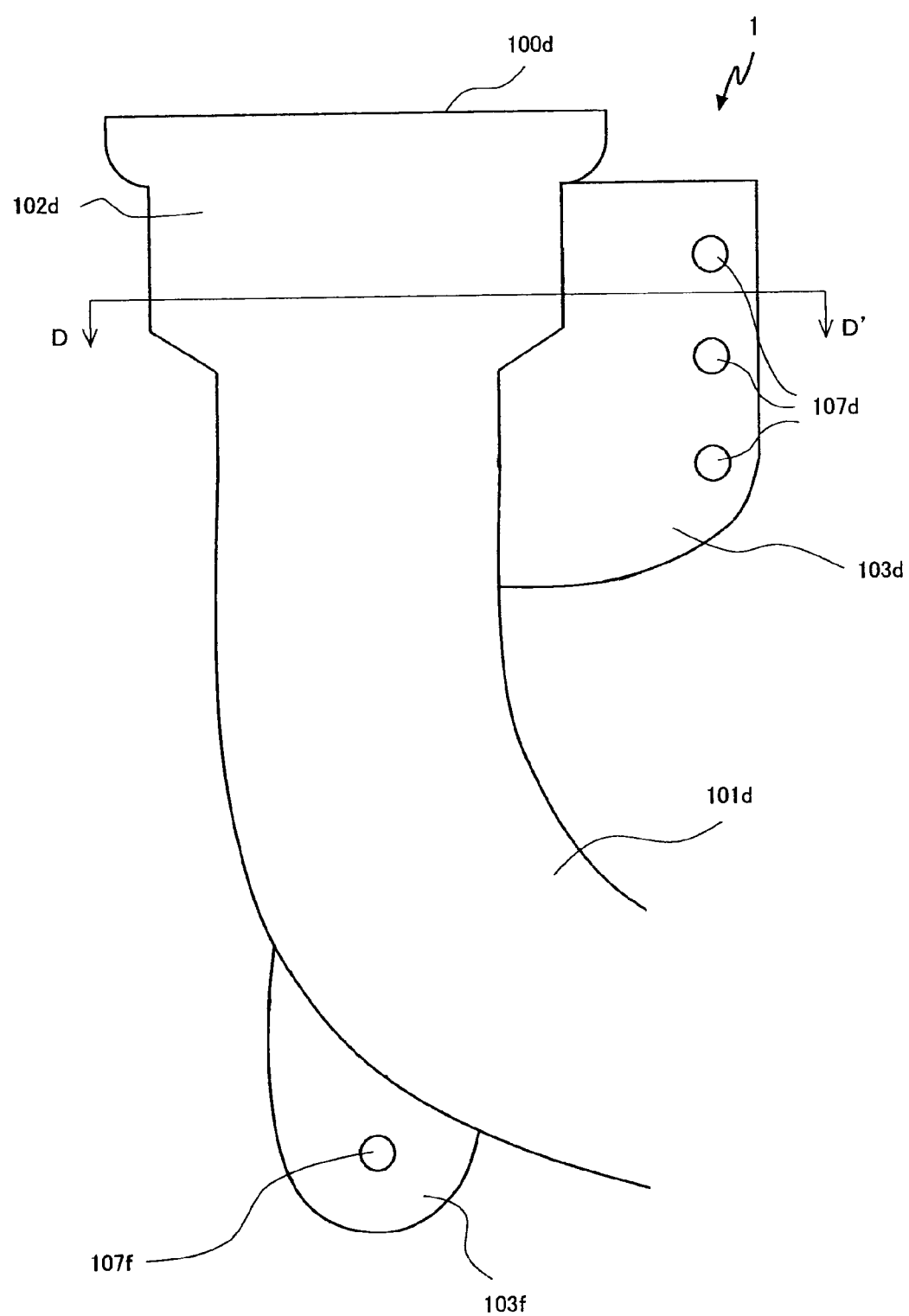
FIG. 8 is a view of the periphery of a fitting portion 102d in the instrument panel duct 1.
Figure 9:
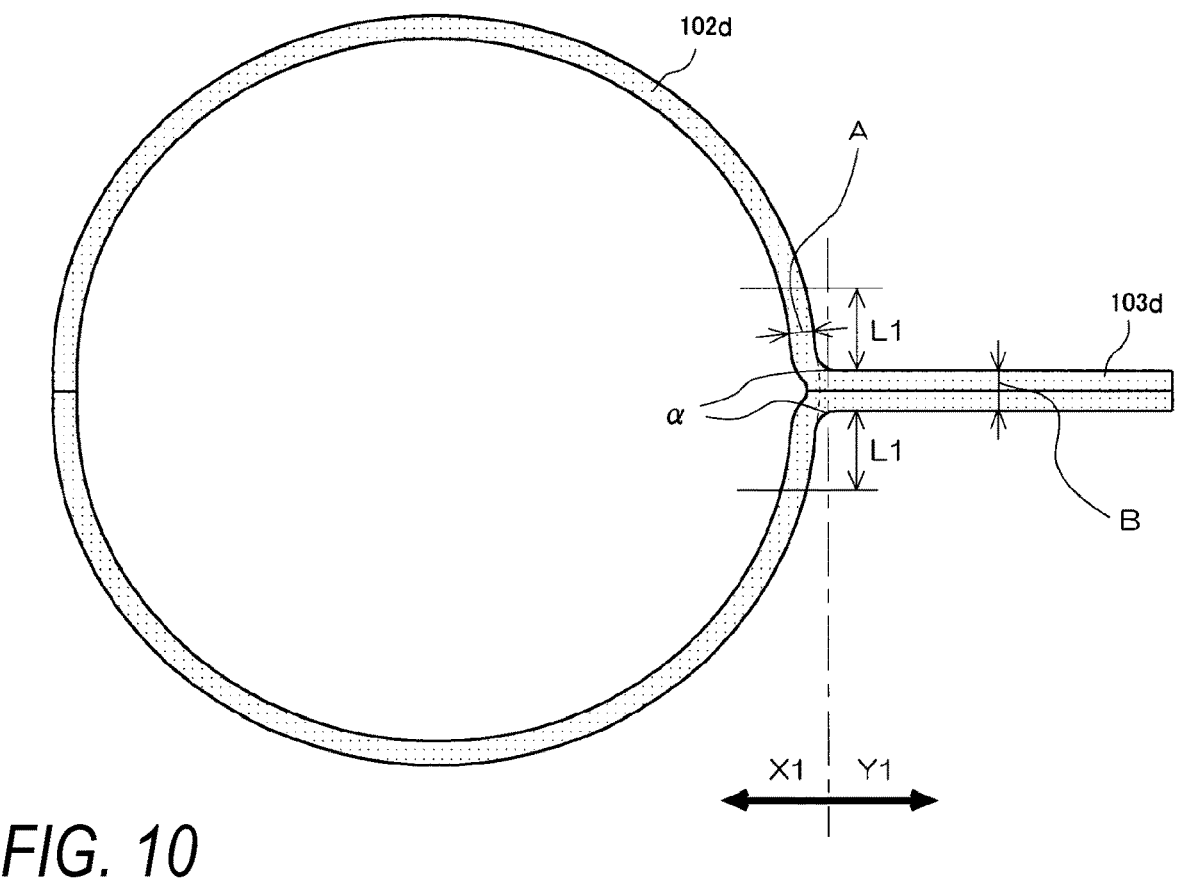
FIG. 9 is a cross-sectional view taken by a D-D' line of FIG. 8.

First, the summary of molded foam 1 of an embodiment of the present invention will be described with reference to FIGS. 7 to 9. FIGS. 7 to 9 are views of a configuration example of the molded foam 1 of the embodiment of the present invention.

The molded foam 1 of the embodiment of the present invention is molded foam including a tube body X1 and a plate-shaped portion Y1 joined to the outer side of the tube body X1, as illustrated in FIG. 9.

The molded foam 1 of the embodiment of the present invention is configured such that a value of thickness B/thickness A is less than 2.82 when the expansion ratio of the molded foam 1 is lower than two. The value of "thickness B/thickness A" as described herein indicates a relationship between the thickness A of the tube body X1 at the periphery of the point joined to the plate-shaped portion Y1 and the thickness B of the plate-shaped portion Y1.

Moreover, it is configured such that when the expansion ratio of the molded foam 1 is equal to or higher than two, the value of thickness B/thickness A is less than 2.88. The value of "thickness B/thickness A" as described herein indicates the relationship between the thickness A of the tube body X1 at the periphery of the point joined to the plate-shaped portion Y1 and the thickness B of the plate-shaped portion Y1.

Figure 4:
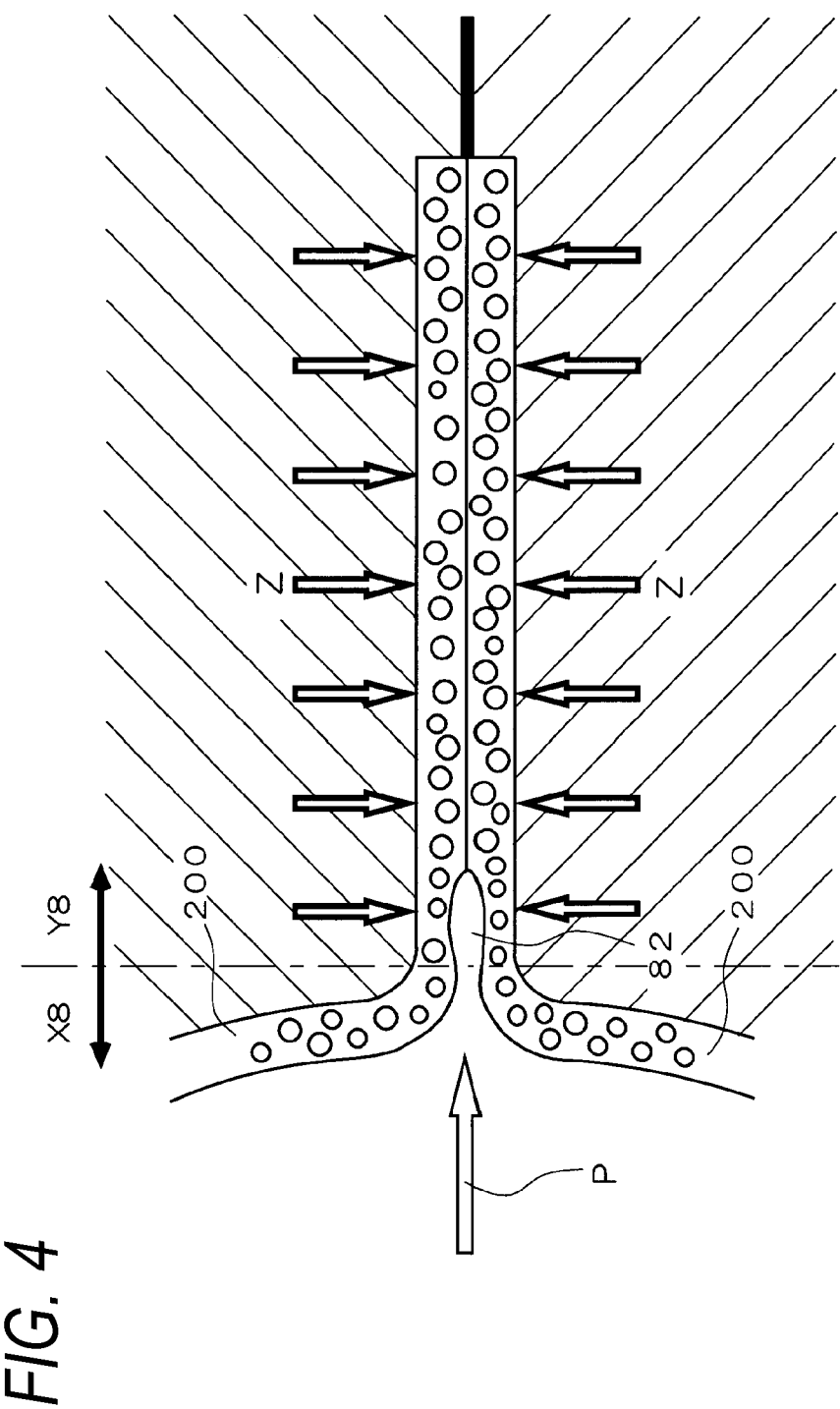
FIG. 4 is a view in the state in which a clearance 82 is caused on the inner surface of the tube body X8.
Figure 5:
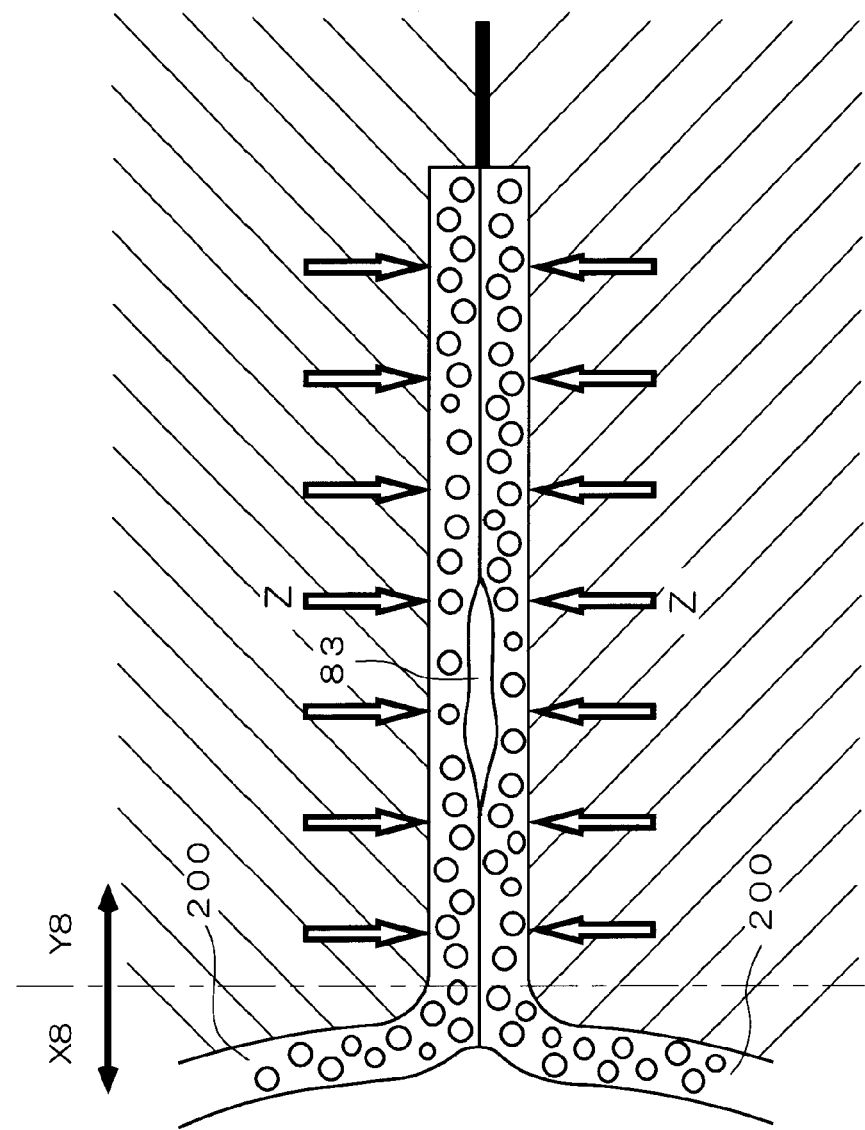
FIG. 5 is a view in the state in which a hollow space 83 is caused in the plate-shaped portion Y8.
Figure 6:
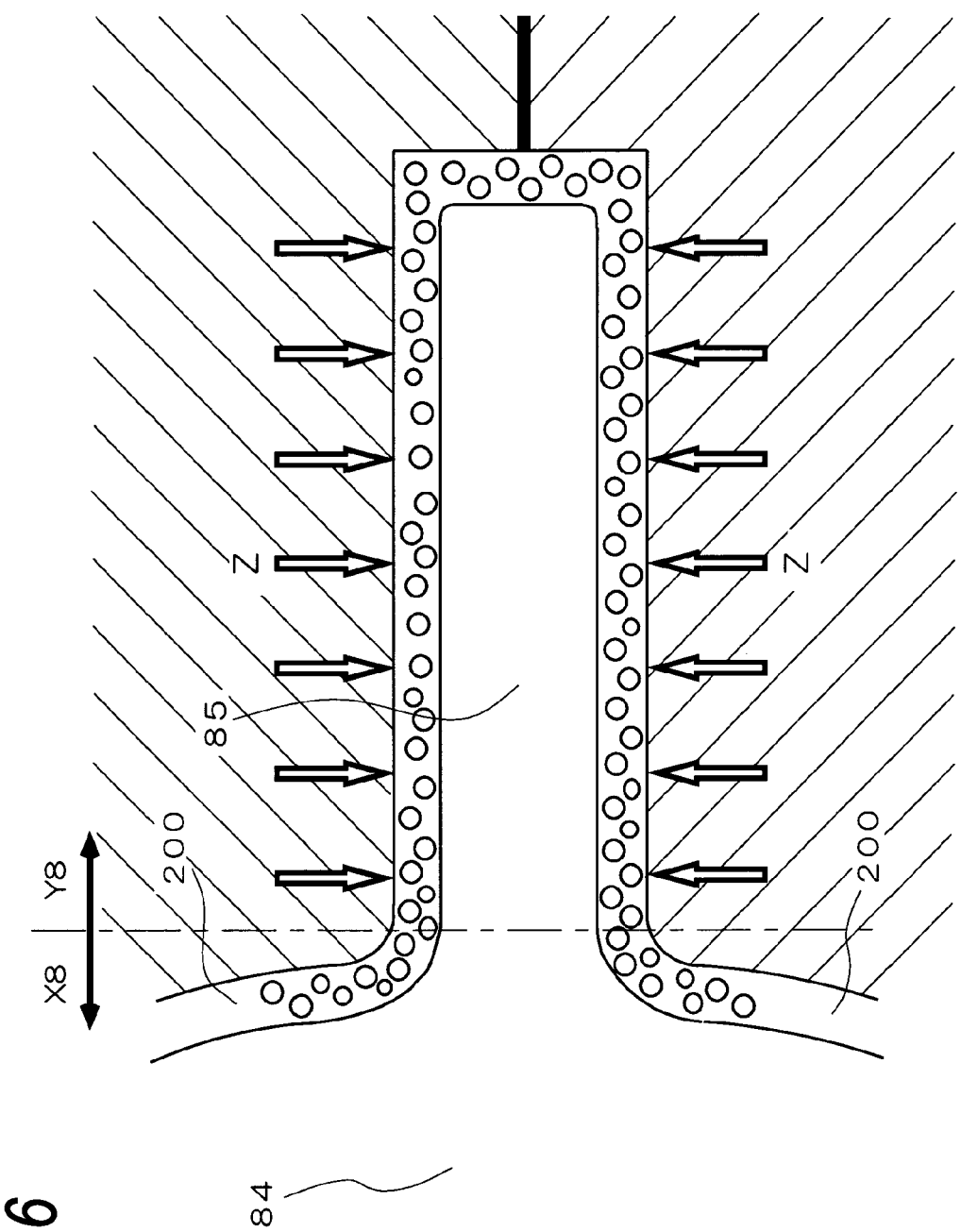
FIG. 6 is a view in the state in which a hollow portion 85 is formed between portions of the plate-shaped portion Y8.

The value of thickness B/thickness A is less than 2.82 when the expansion ratio of the molded foam 1 is lower than two, and is less than 2.88 when the expansion ratio of the molded foam 1 is equal to or higher than two. Thus, as illustrated in FIG. 5, molded foam 1 having no hollow space 83 caused in a plate-shaped portion can be obtained as the molded foam 1 of the embodiment of the present invention. Moreover, as illustrated in FIG. 4, molded foam 1 having no clearance 82 caused on an inner surface of a tube body can be obtained. The molded foam 1 of the embodiment of the present invention will be described in detail below with reference to attached drawings. Note that an instrument panel duct 1 will be described as an example of the molded foam 1 in the following embodiment.

<Configuration Example of Instrument Panel Duct 1>

First, a configuration example of the instrument panel duct 1 of the present embodiment will be described with reference to FIGS. 7 to 9. FIG. 7 is a schematic plan view of the instrument panel duct 1. The instrument panel duct 1 is illustrated from the side with a supply portion 105 for connection with an air conditioning unit (not shown). FIG. 8 is a schematic plan view of the periphery of a fitting portion 102d illustrated in FIG. 7. FIG. 9 is a cross-sectional view taken by a D-D' line of FIG. 8.

The instrument panel duct 1 of the present embodiment is a lightweight instrument panel duct 1 for circulating, to a desired portion, cool or warm air supplied from the air conditioning unit.

The instrument panel duct 1 of the present embodiment is made of polypropylene-based resin, preferably blend resin of polyethylene-based resin of 1 to 20 wt % and/or hydrogenated styrene-based thermoplastic elastomer of 5 to 40 wt %. In this case, a tensile fracture elongation at −10° C. is preferably equal to or higher than 40%, and a tensile elastic modulus at normal temperature is preferably equal to or higher than 1000 kg/cm2. More preferably, the tensile fracture elongation at −10° C. is equal to or higher than 100%. Note that each term used in the present embodiment is defined as follows.

Expansion Ratio: a value was defined as the expansion ratio, which is obtained in such a manner that the density of foamed resin used in a later-described molding method of the present embodiment is divided by an apparent density at the tube body X1 (see FIG. 9) of the instrument panel duct 1 obtained by the molding method of the present embodiment.

Tensile Fracture Elongation: the tube body X1 of the instrument panel duct 1 obtained by the later-described molding method of the present embodiment was cut out. The cut tube body X1 was stored at −10° C. Subsequently, the stored tube body X1 as a No. 2 type test piece was measured with a tensile speed of 50 mm/min. according to JIS K-7113. The value obtained by such measurement was defined as the tensile fracture elongation.

Tensile Elastic Modulus: the tube body X1 of the instrument panel duct 1 obtained by the later-described molding method of the present embodiment was cut out. The cut tube body X1 as a No. 2 type test piece was measured with a tensile speed of 50 mm/min. at normal temperature (e.g., 23° C.) according to JIS K-7113. The obtained value was defined as the tensile elastic modulus.

As illustrated in FIG. 7, in the instrument panel duct 1 of the present embodiment, the supply portion 105 for connection with the air conditioning unit (not shown) is provided at one end of a tube portion 101 (101a to 101d). Moreover, a fitting portion 102 (102a to 102d) is provided at the other end of the tube portion 101 (101a to 101d). Further, a flange portion 103 (103a to 103g) is joined to the tube body X1 (see FIG. 9) including the tube portion 101 (101a to 101d), the supply portion 105, and the fitting portion 102 (102a to 102d).

The instrument panel duct 1 of the present embodiment has a closed cell structure (e.g., a closed cell content of equal to or higher than 70%) having an expansion ratio of equal to or higher than 1.3 and a plurality of cells. Moreover, the instrument panel duct 1 has an average thickness of equal to or greater than 0.5 mm.

The average thickness in the present embodiment means a thickness average measured at an equal interval of about 100 mm in a hollow extending direction of a molded article. For a hollow molded article, the thickness of each of two wall portions welded at a parting line is measured at a position in a 90° direction from the parting line. The average of the measured thicknesses means the average thickness. Note that the measurement positions do not include the flange portion 103 etc. as described above.

The inner side of the tube body X1 is configured to have a channel through which fluid circulates. With this configuration, cool or warm air of the air conditioning unit circulates.

As illustrated in FIG. 7, the channel of fluid supplied from an opening 111 of the supply portion 105 into the tube body X1 is branched into four channels a, b-1, b-2, c. In the channel a, the fluid supplied from the opening 111 of the supply portion 105 into the tube body X1 flows out from an opening of the fitting portion 102a. In the channel b-1, the fluid flows out from an opening of the fitting portion 102b. In the channel b-2, the fluid flows out from an opening of the fitting portion 102c. In the channel c, the fluid flows out from an opening of the fitting portion 102d.

In a configuration around the channel a in the instrument panel duct 1, the supply portion 105 is provided at one end of the tube portion 101a, and the fitting portion 102a is provided at the other end of the tube portion 101a. Moreover, the flange portions 103a, 103e are joined to the tube body X1 including the tube portion 101a, the supply portion 105, and the fitting portion 102a. Fixing holes 107a for fixing to another tubular member to be connected to the fitting portion 102a open at the flange portion 103a. Not-shown bolts are inserted respectively into the fixing holes 107a, and then, are fastened with nuts. In this manner, the instrument panel duct 1 can be fixed to another tubular member. Moreover, a fixing hole 107*e* also opens at the flange portion 103*e*.

In a configuration around the channel b-1 in the instrument panel duct 1, the supply portion 105 is provided at one end of the tube portion 101*b*, and the fitting portion 102*b* is provided at the other end of the tube portion 101*b*. Moreover, the flange portion 103*b* is joined to the tube body X1 including the tube portion 101*b*, the supply portion 105, and the fitting portion 102*b*. Fixing holes 107*b* for fixing to another tubular member to be connected to the fitting portion 102*b* open at the flange portion 103*b*.

At a narrow portion between the tube portions 101*a*, 101*b*, a bridge portion 104*e* for maintaining strength is joined to each of the tube portions 101*a*, 101*b*.

A configuration around the channel b-2 in the instrument panel duct 1 is similar to the above-described configuration around the channel b-1.

A configuration around the channel c in the instrument panel duct 1 is similar to the above-described configuration around the channel a.

The flange portion 103*g* is provided between the tube portions 101*b*, 101*c*, and is joined to each of the tube portions 101*b*, 101*c*. A fixing hole 107*g* also opens at the flange portion 103*g*.

As illustrated in FIG. 7, in the instrument panel duct 1 of the present embodiment, the flange portion 103 (103*a* to 103*g*) is joined to the outer side of the tube body X1 (see FIG. 9). The tube body X1 means a portion including the tube portion 101 (101*a* to 101*d*), the supply portion 105, and the fitting portion 102 (102*a* to 102*d*).

As illustrated in FIG. 9, the instrument panel duct 1 of the present embodiment is configured to have a thickness B/thickness A value of greater than 1.40 and less than 2.82 when the expansion ratio is lower than two. The value of "thickness B/thickness A" described herein indicates the relationship between the thickness A of the tube body X1 at the periphery of the point joined to the plate-shaped portion Y1 and the thickness B of the plate-shaped portion Y1. This is because of the following reason. If the value of thickness B/thickness A is equal to or less than 1.40, when the instrument panel duct 1 with an expansion ratio of less than two is molded, there are signs of generation of the balloon-shaped cell 81 illustrated in FIG. 2, or the balloon-shaped cell 81 is caused. Moreover, when the value of thickness B/thickness A is equal to or greater than 2.82, the clearance 82 illustrated in FIG. 4 or the hollow space 83 in the plate-shaped portion Y1 as illustrated in FIG. 5 is caused.

As illustrated in FIG. 9, the thickness A is the thickness of the tube body X1 within a range L1 of 5 mm from a point α joined to the plate-shaped portion Y1. The thickness B is the thickness of the plate-shaped portion Y1 in the thickness direction thereof, as illustrated in FIG. 9.

The instrument panel duct 1 of the present embodiment is configured to have a thickness B/thickness A value of greater than 1.46 and less than 2.88 when the expansion ratio is equal to or higher than two. This is because of the following reason. If the value of thickness B/thickness A is equal to or less than 1.46, when the instrument panel duct 1 with an expansion ratio of equal to or higher than two is molded, there are signs of generation of the balloon-shaped cell 81 illustrated in FIG. 2, or the balloon-shaped cell 81 is caused. Moreover, when the value of thickness B/thickness A is equal to or greater than 2.88, the clearance 82 illustrated in FIG. 4 or the hollow space 83 in the plate-shaped portion Y1 as illustrated in FIG. 5 is caused.

Thus, the instrument panel duct 1 of the present embodiment is configured to have a thickness B/thickness A value of greater than 1.40 and less than 2.82 when the expansion ratio is lower than two and to have a thickness B/thickness A value of greater than 1.46 and less than 2.88 when the expansion ratio is equal to or higher than two. With this configuration, the instrument panel duct 1 can be obtained without generation of the balloon-shaped cell 81 illustrated in FIG. 2, the clearance 82 illustrated in FIG. 4, and the hollow space 83 in the plate-shaped portion Y1 as illustrated in FIG. 5.

Note that the plate-shaped portion Y1 of the instrument panel duct 1 is a portion to be connected to another member. Thus, the plate-shaped portion Y1 has a desired structural strength. Thus, the value of thickness B/thickness A is preferably equal to or greater than 1.80, more preferably equal to or greater than 2.0. This allows the thickness B to be greater than the thickness A, and therefore, the plate-shaped portion Y1 can have the desired structural strength. Note that in order to provide the plate-shaped portion Y1 with the desired structural strength, the thickness B is preferably designed to equal to or greater than 4.0 mm.

An opening 100 of the fitting portion 102 in the instrument panel duct 1 of the present embodiment has a greater opening area than that of the tube portion 101. The opening area of the tube portion 101 means the area of an opening of the tube portion 101 shown when the tube portion 101 is cut in the direction perpendicular to the channel traveling direction of the instrument panel duct 1. A greater area of the opening 100 of the fitting portion 102 than that of the tube portion 101 can be realized in such a manner that the fitting portion 102 is formed into a trumpet shape, for example. The trumpet shape means a shape whose opening area increases toward an opening end portion.

<Molding Method Example of Instrument Panel Duct 1>

Figure 10:
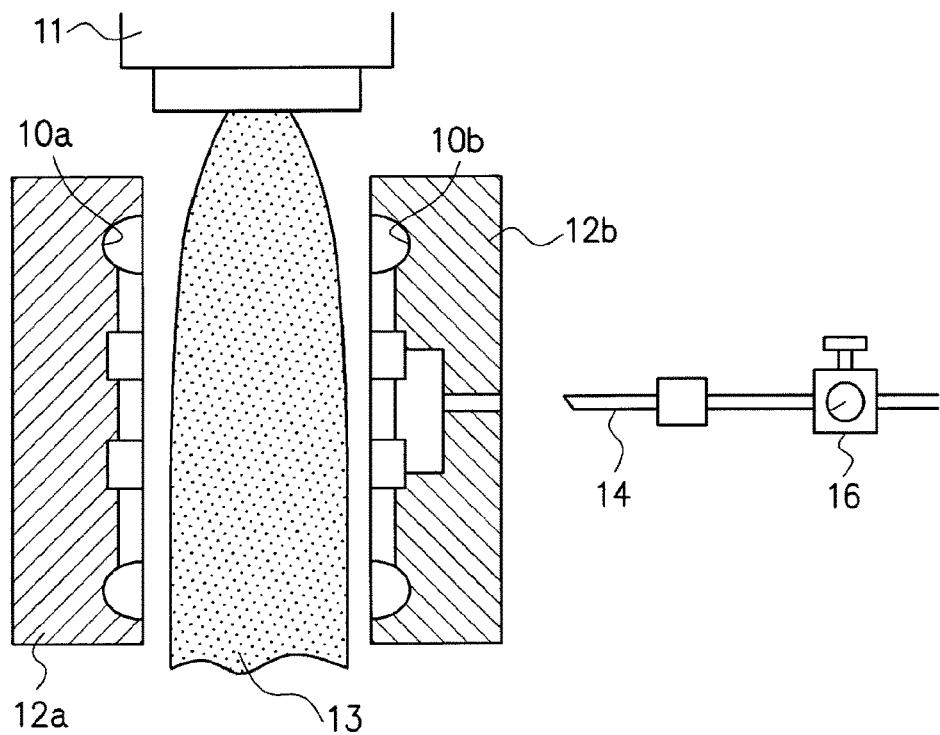
FIG. 10 is a first view of a molding method example of the instrument panel duct 1 of the embodiment.
Figure 11:
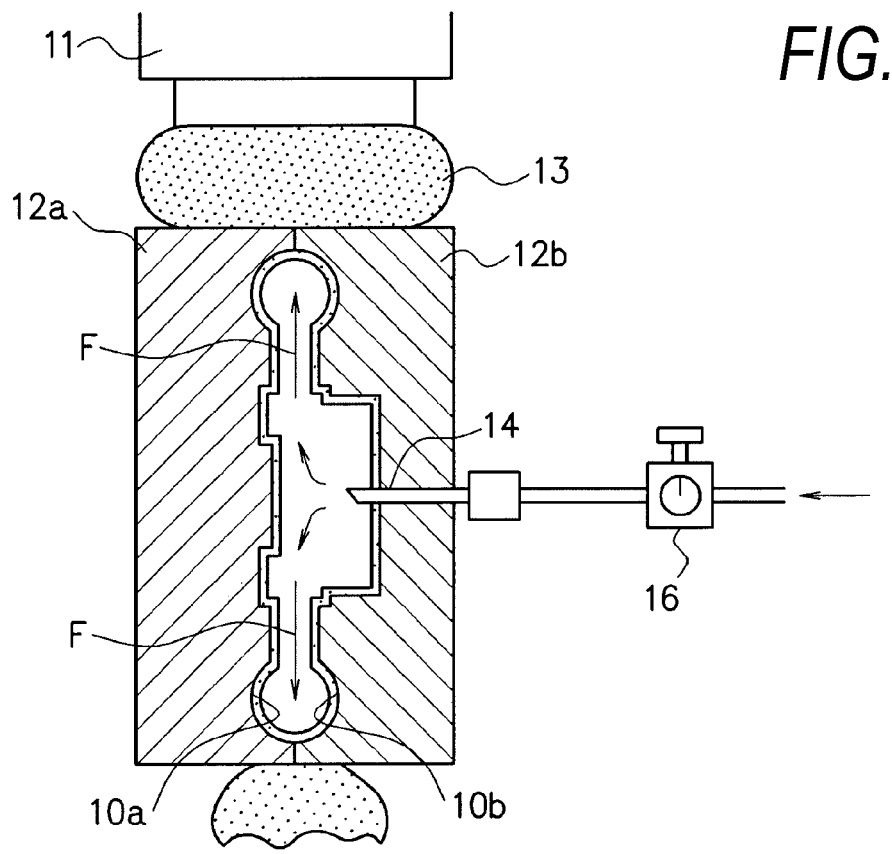
FIG. 11 is a second view of the molding method example of the instrument panel duct 1 of the embodiment.
Figure 12:
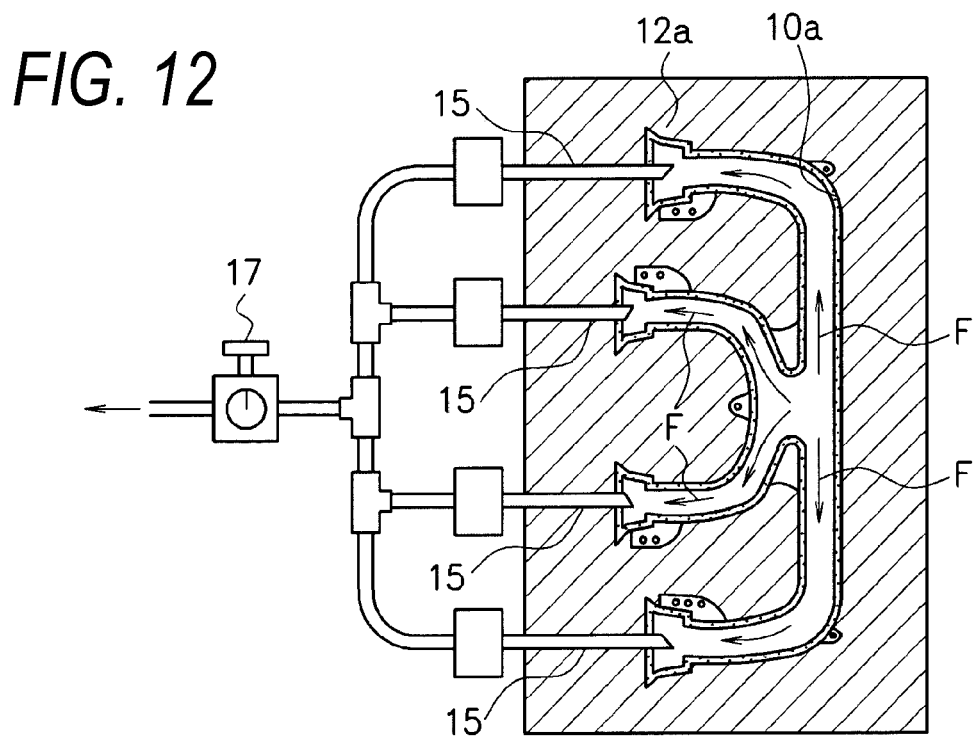
FIG. 12 is a third view of the molding method example of the instrument panel duct 1 of the embodiment.

Next, a molding method example of the instrument panel duct 1 of the present embodiment will be described with reference to FIGS. 10 to 12. FIG. 10 is a view of an open state of split mold blocks from the side thereof, and FIG. 11 is a view of a closed state of the split mold blocks from the side thereof. FIG. 12 is a view of a split mold block 12*a* from a contact surface between two split mold blocks in the closed state thereof.

First, as illustrated in FIG. 10, foamed parison is injected from an annular dice 11. Then, the foamed parison 13 in a tubular shape is extruded between the split mold blocks 12*a*, 12*b*.

Next, the split mold blocks 12*a*, 12*b* are clamped together, and therefore, the foamed parison 13 is sandwiched between the split mold blocks 12*a*, 12*b* as illustrated in FIG. 11. Thus, the foamed parison 13 is housed in cavities 10*a*, 10*b* of the split mold blocks 12*a*, 12*b*.

Next, as illustrated in FIGS. 11 and 12, a blow-in needle 14 and blow-out needles 15 penetrate respectively through predetermined holes provided at the split mold blocks 12*a*, 12*b* with the split mold blocks 12*a*, 12*b* being clamped together. Simultaneously, the blow-in needle 14 and the blow-out needles 15 are stabbed into the foamed parison 13. Right after tip ends of the blow-in needle 14 and the blow-out needles 15 enter the foamed parison 13, compressed gas such as air is blown into the foamed parison 13 from the blow-in needle 14. Then, the compressed gas is blown out from the blow-out needles 15 by way of the inside of the foamed parison 13. Then, blow molding is performed with a predetermined blow pressure.

The blow-in needle 14 is stabbed into a position corresponding to the opening 111 of the supply portion 105 of the instrument panel duct 1 illustrated in FIG. 7. The blow-in needle 14 forms a blow-in port through which the compressed gas is blown into the foamed parison 13. Moreover, each blow-out needle 15 is stabbed into a position corresponding to the associated opening 100 (an associated one of the openings 100a to 100d) of the fitting portion 102 (102a to 102d) of the instrument panel duct 1 illustrated in FIG. 7. Each blow-out needle 15 forms a blow-out port through which the compressed gas is blown out from the inside of the foamed parison 13.

With this configuration, the compressed gas is blown into the foamed parison 13 from the blow-in needle 14, and then, is blown out from the blow-out needles 15 by way of the inside of the foamed parison 13. In this manner, blow molding can be performed with the predetermined blow pressure.

The blow pressure is set at 0.5 to 3.0 kg/cm.sup.2, preferably 0.5 to 1.0 kg/cm.sup.2. When the blow pressure is set at equal to or higher than 3.0 kg/cm.sup.2, the thickness of the foamed parison 13 is easily decreased, or the expansion ratio of the foamed parison 13 is easily decreased. When the block pressure is set at equal to or lower than 0.5 kg/cm.sup.2, it is difficult to adjust a differential pressure between a regulator 16 and an exhaust pressure regulator 17. Thus, the blow pressure is set at 0.5 to 3.0 kg/cm.sup.2, preferably 0.5 to 1.0 kg/cm.sup.2.

In the present embodiment, the compressed gas is blown into the foamed parison 13 from the blow-in needle 14, and then, is exhausted from the cavities 10a, 10b of the split mold blocks 12a, 12b. Thus, a negative pressure state is brought about without a clearance between the foamed parison 13 and each cavity 10a, 10b. Thus, a pressure difference (meaning that the inside of the foamed parison 13 has a higher pressure than that of the outside of the foamed parison 13) between the inside and outside of the foamed parison 13 housed in the cavities 10a, 10b of the split mold blocks 12a, 12b is set, and the foamed parison 13 is pressed against wall surfaces of the cavities 10a, 10b.

Note that at the above-described molding steps, the step of blowing the compressed gas into the foamed parison 13 and the step of generating negative pressure outside the foamed parison 13 are not necessarily performed at the same time. These steps may be performed with a time lag.

Figure 13:
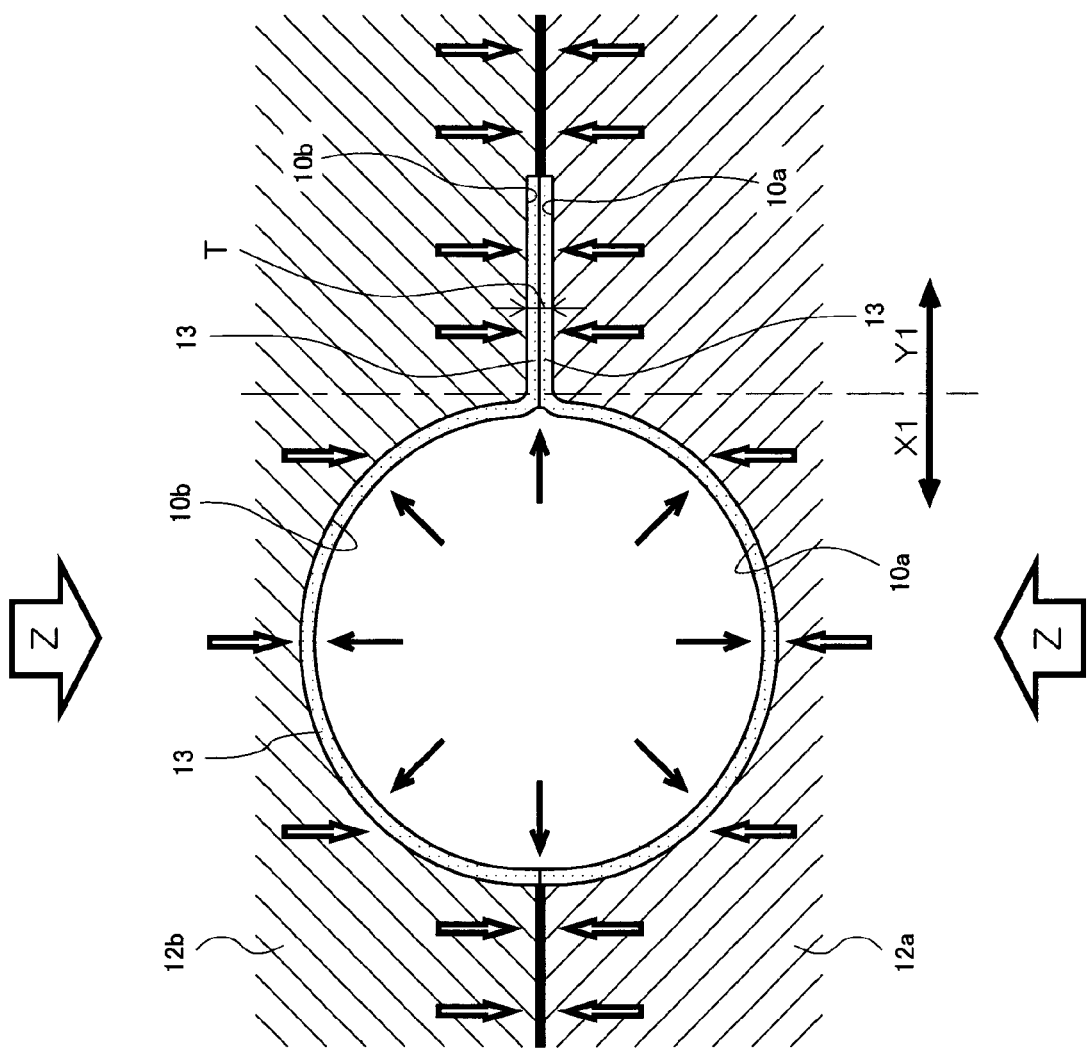
FIG. 13 is a view of the state of clamping by split mold blocks.

Moreover, in the present embodiment, the foamed parison 13 is, using pressing force Z, clamped by the split mold blocks 12a, 12b as illustrated in FIG. 13. Of the foamed parison 13, a portion to be the tube body X1 is, as described above, pressed against the cavities 10a, 10b with the predetermined blow pressure, and a portion to be the plate-shaped portion Y1 including the flange portion 103 (103a to 103g) and the bridge portion 104 (104e, 104f) is, in the thickness direction thereof, pressed and compressed to the thickness T between the cavities 10a, 10b of the split mold blocks 12a, 12b.

For the foamed parison 13 portion to be the tube body X1, compressed gas such as air is, as described above, blown into the foamed parison 13 from the blow-in needle 14, and then, is blown out form the blow-out needles 15 by way of the inside of the foamed parison 13. Then, the foamed parison 13 is pressed against the cavities 10a, 10b with the predetermined blow pressure for a predetermined time period. Then, about 50% to 80% of the foamed parison 13 is cooled and solidified from the sides close to the cavities 10a, 10b in the thickness direction of the tube body X1. Subsequently, the remaining foamed parison 13 in a molten state is, without cooling with the compressed gas, naturally solidified with the split mold blocks 12a, 12b being clamped together.

The temperature of the compressed gas supplied from the blow-in needle 14 into the foamed parison 13 for the purpose of cooling is set at 10° C. to 30° C., preferably at a room temperature (e.g., 23° C.). If the temperature of the compressed gas is set at the room temperature, temperature adjustment equipment for adjusting the temperature of the compressed gas is not necessarily provided. Thus, the instrument panel duct 1 can be molded at a low cost. In the case where the temperature adjustment equipment is provided to adjust the temperature of the compressed gas supplied from the blow-in needle 14 into the foamed parison 13 to a temperature lower than the room temperature, the time for cooling the instrument panel duct 1 can be shortened. Note that although depending on the temperature of the compressed gas, the time (meaning an application time) for cooling with the compressed gas is preferably equal to or shorter than 35 seconds. Thus, about 50% to 80% of the foamed parison 13 can be cooled and solidified from the sides close to the cavities 10a, 10b in the thickness direction of the tube body X1, and further, the foamed parison 13 on an inner surface side of the tube body X1 can be maintained in the molten state. Subsequently, the remaining foamed parison 13 in the molten state is, instead of performing cooling with the compressed gas, naturally solidified with the split mold blocks 12a, 12b being clamped together.

The polypropylene-based resin applicable in molding of the instrument panel duct 1 of the present embodiment is preferably polypropylene having melt tension within a range of 30 to 350 mN at 230.degree. C. Particularly preferably, the polypropylene-based resin is propylene homopolymer having a long-chain branch structure. More preferably, ethylene-propylene block copolymer is added to the polypropylene-based resin.

For the purpose of improving impact resistance and maintaining stiffness of the instrument panel duct 1, the hydrogenated styrene-based thermoplastic elastomer to be blended with the polypropylene-based resin is added to the polypropylene-based resin within a range of 5 to 40 wt %, preferably a range of 15 to 30 wt %.

Specifically, hydrogenated polymer such as styrene-butadiene-styrene block copolymer, styrene-isoprene-styrene block copolymer, or styrene-butadiene random copolymer is used. The styrene content of the hydrogenated styrene-based thermoplastic elastomer is less than 30 wt %, preferably less than 20 wt %. MFR (measured with a test load of 2.16 kg at a test temperature of 230.degree. C. according to JIS K-7210) at 230.degree. C. is equal to or less than 10 g/10 min., preferably equal to or less than 5.0 g/10 min. and equal to or greater than 1.0 g/10 min.

Polyolefin-based polymer to be blended with the polypropylene-based resin is preferably low-density ethylene-α-olefin. The polyolefin-based polymer is preferably blended within a range of 1 to 20 wt %. Preferably, low-density ethylene-α-olefin having a density of equal to or lower than 0.91 g/cm.sup.3 is used. Ethylene-α-olefin copolymer obtained by copolymerization of ethylene and α-olefin with a carbon atom number of 3 to 20 is preferable. Examples of α-olefin include propylene, 1-butene, 1-pentene, 1-hexene, 1-heptene, 1-octene, 1-nonene, 1-decene, 1-dodecene, 4-methyl-1-pentene, and 4-methyl-1-hexene. In particular, 1-butene, 1-hexene, and 1-octene are preferable, for example. The above-described types of α-olefin with a carbon atom number of 3 to 20 may be used alone or in combination of two or more types. The content of a monomeric unit based on ethylene in the ethylene-α-olefin copolymer is preferably within a range of 50 to 99 wt % with respect to the ethylene-α-olefin copolymer. Moreover, the content of a monomeric unit based on α-olefin is preferably within a range of 1 to 50 wt % with respect to the ethylene-α-olefin copolymer. Particularly preferably, straight-chain very-low polyethylene polymerized using metallocene-based catalyst, ethylene-based elastomer, or propylene-based elastomer is used.

The foamed resin used in molding of the instrument panel duct 1 can be formed using a regrind material obtained by grinding of burrs caused in molding of the instrument panel duct 1. In this case, the foamed resin is preferably formed by melting and kneading of the regrind material and a virgin material rather than being 100% formed from the regrind material. The virgin material is unused resin. In the present embodiment, the above-described polyethylene-based resin is used as the virgin material. With use of the virgin material, deterioration of the resin forming the instrument panel duct 1 can be avoided. In the case of forming the foamed resin by melting and kneading of the regrind material and the virgin material, the regrind material and the virgin material are molten and kneaded in a ratio of 90% to 10%.

Examples of a foaming agent applicable in molding of the instrument panel duct 1 of the present embodiment include a physical foaming agent, a chemical foaming agent, and a mixture thereof. Examples of the applicable physical foaming agent include inorganic physical foaming agents such as air, carbonic acid gas, nitrogen gas, and water; organic physical foaming agents such as butane, pentane, hexane, dichloromethane, and dichloroethane; and supercritical fluid thereof. The supercritical fluid is preferably produced using, e.g., carbon dioxide or nitrogen. In the case of using nitrogen, the supercritical fluid can be produced with a supercritical pressure of equal to or higher than 3.4 MPa at a supercritical temperature of −149.1° C. In the case of using carbon dioxide, the supercritical fluid can be produced with a supercritical pressure of equal to or higher than 7.4 MPa at a supercritical temperature of 31° C.

Next, the molded instrument panel duct 1 as described above is taken out from the split mold blocks 12a, 12b. Specifically, the split mold blocks 12a, 12b are opened in the state in which burrs formed at an upper portion of the instrument panel duct 1 are pinched with a predetermined machine (e.g., a clip), and then, the instrument panel duct 1 is taken out from between the split mold blocks 12a, 12b.

Next, unnecessary portions, such as burrs, formed around the instrument panel duct 1 taken out from the split mold blocks 12a, 12b are removed. As a result, the instrument panel duct 1 in a complicated shape illustrated in FIG. 7 can be obtained.

In the instrument panel duct 1 of the present embodiment, the flange portion 103 (103a to 103g) and the bridge portion 104 (104e, 104f) are provided in the vicinity of all of the openings 100 (100a to 100d), 111 formed at the fitting portion 102 (102a to 102d) and the supply portion 105 forming the tube body X1, as illustrated in FIG. 7. Thus, the instrument panel duct 1 of the present embodiment can be fixed to another tubular member at the periphery of the openings 100, 111. Moreover, the strength of the periphery of the openings 100, 111 can be enhanced.

Another Molding Method Examples

Figure 14:
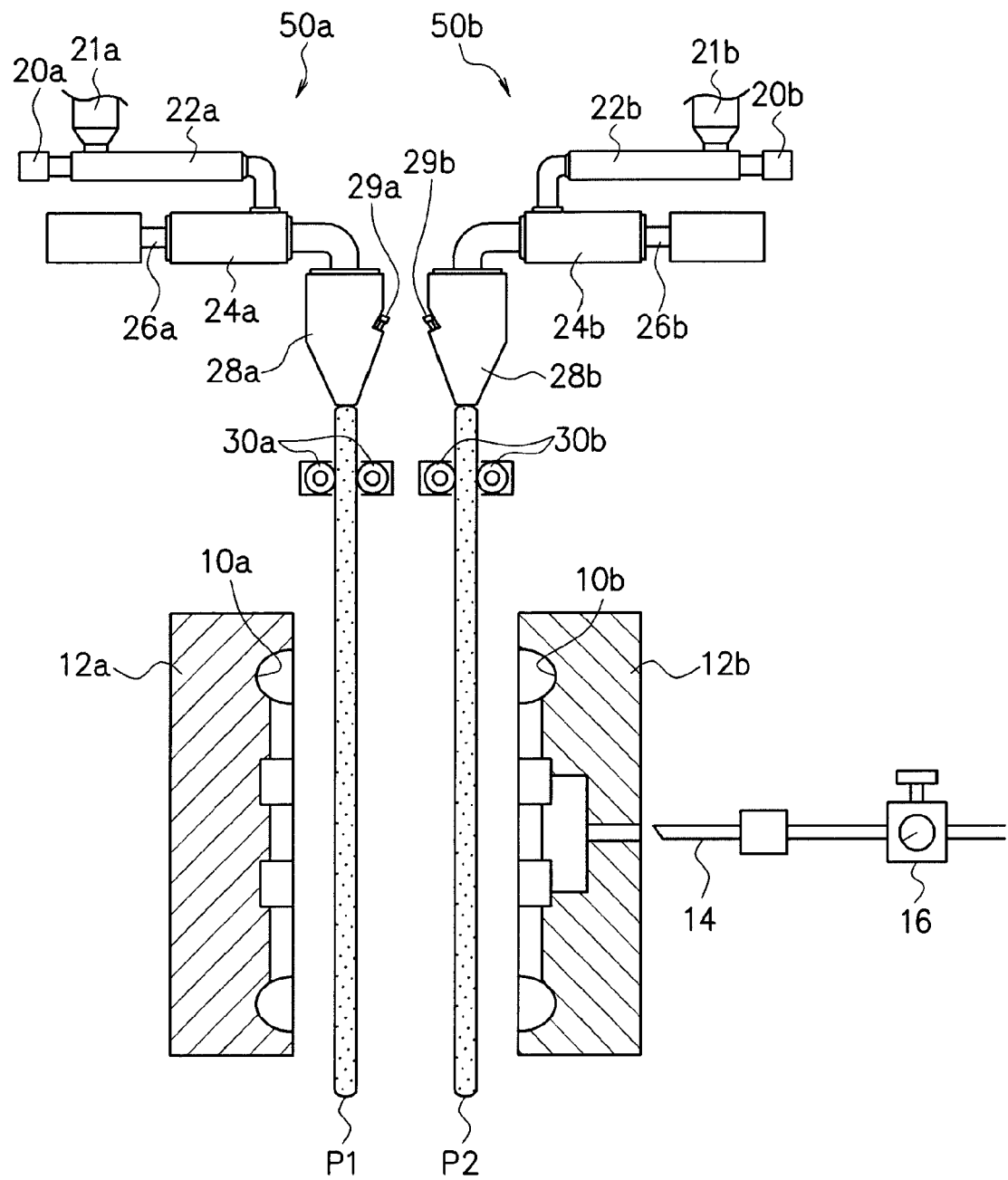
FIG. 14 is a view of another molding method example.

The above-described instrument panel duct 1 as the embodiment can be molded by, e.g., a molding method illustrated in FIG. 14.

In the molding method illustrated in FIG. 14, molding is performed in such a manner that the foamed resin in the form of sheet is extruded between the split mold blocks 12a, 12b instead of performing, by the above-described molding method, molding in such a manner that the tubular foamed parison 13 is extruded between the split mold blocks 12a, 12b.

A molding device used in other molding methods includes, as illustrated in FIG. 14, two extrusion devices 50a, 50b and split mold blocks 12a, 12b similar to those of the above-described molding method example.

In the extrusion devices 50 (50a, 50b), resin sheets P1, P2 made of foamed resin in a molten state similar to the foamed parison 13 of the above-described molding method example are arranged between the split mold blocks 12a, 12b to suspend substantially parallel to each other with a predetermined spacing. Adjustment rollers 30a, 30b are arranged below T-dies 28a, 28b configured to extrude the resin sheets P1, P2. The adjustment rollers 30a, 30b adjust a thickness etc. The resin sheets P1, P2 extruded as described above are sandwiched and clamped between the split mold blocks 12a, 12b, and in this manner, molding is performed.

Two extrusion devices 50 (50a, 50b) have a similar configuration. Thus, one of the extrusion devices 50 will be described with reference to FIG. 14.

The extrusion device 50 includes a cylinder 22 to which a hopper 21 is attached, a screw (not shown) provided in the cylinder 22, a hydraulic motor 20 coupled to the screw, an accumulator 24 communicating with the cylinder 22, a plunger 26 provided in the accumulator 24, the T-die 28, and the pair of adjustment rollers 30.

A resin pellet injected through the hopper 21 is molten by rotation of the screw by the hydraulic motor 20 in the cylinder 22, and then, is kneaded. A certain amount of the foamed resin in the molten state is delivered to the accumulator 24, and then, is stored. Then, the foamed resin is sent to the T-die 28 by driving of the plunger 26. In this manner, the resin sheet made of the foamed resin in the molten state is continuously extruded from an extrusion slit at a lower end of the T-die 28. Such a resin sheet is sent downward while being compressed between the pair of adjustment rollers 30 arranged with a spacing, and then, suspends between the split mold blocks 12a, 12b.

The T-die 28 is further provided with a die bolt 29 configured to adjust a slit spacing of the extrusion slit. The mechanism for adjusting the slit spacing may include not only a mechanical mechanism using the die bolt 29, but also various well-known adjustment mechanisms.

With this configuration, the resin sheets P1, P2 having foamed cells are extruded respectively from the extrusion slits of two T-dies 28a, 28b. The resin sheets P1, P2 are adjusted to the state in which the resin sheets P1, P2 have a uniform thickness in the vertical direction (meaning an extrusion direction), and then, suspend between the split mold blocks 12a, 12b.

When the resin sheets P1, P2 are arranged between the split mold blocks 12a, 12b, the split mold blocks 12a, 12b move forward in the horizontal direction. A not-shown frame positioned at the outer periphery of the split mold blocks 12a, 12b comes into close contact with the resin sheets P1, P2. Thus, the resin sheets P1, P2 are held by the frame at the outer periphery of the split mold blocks 12a, 12b. Subsequently, the resin sheets P1, P2 are vacuum-sucked into the cavities 10a, 10b of the split mold blocks 12a, 12b. In this manner, each of the resin sheets P1, P2 is formed into a shape along a corresponding one of the cavities 10a, 10b.

Next, clamping is performed in such a manner that the split mold blocks 12a, 12b move forward in the horizontal direction. As in the above-described molding method, the blow-in needle 14 and the blow-out needles 15 are stabbed into the resin sheets P1, P2. Compressed gas such as air is blown into the resin sheets P1, P2 from the blow-in needle 14. The compressed gas is blown out from the blow-out needles 15 by way of the inside of the resin sheets P1, P2. In this manner, the inside of the portion to be the tube body X1 of the instrument panel duct 1 is cooled.

Next, the split mold blocks 12a, 12b move backward in the horizontal direction, and therefore, are demolded from the instrument panel duct 1.

Note that in order to prevent variation in the thicknesses of the resin sheets P1, P2 suspending between the pair of split mold blocks 12a, 12b due to drawdown or neck-in, the thickness of the resin sheet, an extrusion speed, thickness distribution in the extrusion direction, etc. need to be separately adjusted.

For such adjustment of the thickness of the resin sheet, the extrusion speed, the thickness in the extrusion direction, etc., various well-known methods can be used.

As described above, as in the molding method described with reference to FIGS. 10 to 12, the instrument panel duct 1 of the present embodiment can be also suitably molded by another molding method example illustrated in FIG. 14. Moreover, in another molding method example illustrated in FIG. 14, the instrument panel duct 1 corresponding to various conditions can be molded because a material, an expansion ratio, a thickness, etc. are difference between two resin sheets P1, P2.

EXAMPLES

Next, the above-described instrument panel duct 1 will be described with reference to examples. Note that the above-described embodiment is not limited to the examples described below.

First Example

Figure 15:
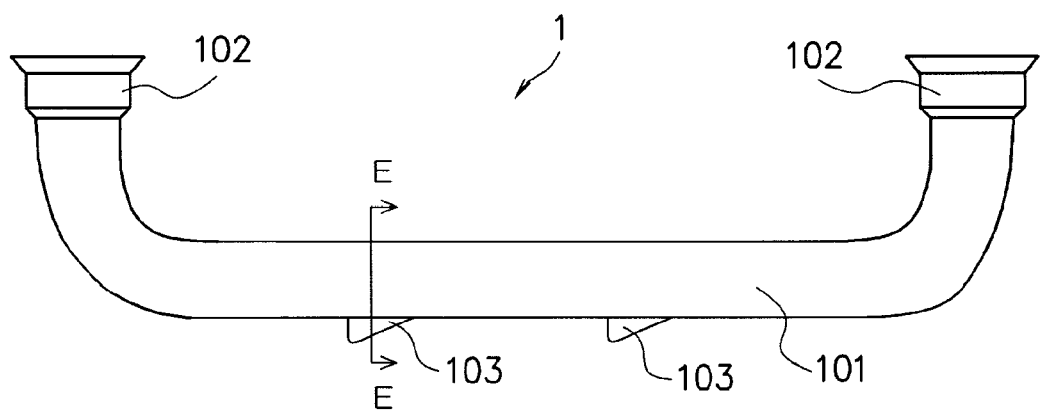
FIG. 15 is a view of an instrument panel duct 1 of an example.

In the present example, foamed parison produced with the following raw material compounding ratio was used as raw resin for an instrument panel duct 1. Using a foamed blow molding machine including a screw extruder having a cylinder with a gas supply port, supercritical fluid of nitrogen was added through the gas supply port. In a molding method similar to that described above with reference to FIGS. 10 to 12, an instrument panel duct 1 in a simple shape as illustrated in FIG. 15 was molded. The instrument panel duct 1 illustrated in FIG. 15 has a simple structure including fitting portions 102 provided respectively at both ends of a tube portion 101. As in the instrument panel duct 1 illustrated in FIG. 7, the instrument panel duct 1 illustrated in FIG. 15 is also configured such that flange portions 103 are joined to a tube body X1 (see FIG. 9) including the tube portion 101 and the fitting portions 102. Thus, in the instrument panel duct 1 illustrated in FIG. 15, a cut plane (a cross section along an E-E line of FIG. 15) at a point where the flange portion 103 is joined has a shape similar to that of FIG. 9.

Raw Material Compounding Ratio of Foamed Parison
  WB140/C4BSW/DF605=55 parts/40 parts/5 parts
  PO217K: 1 part, Black MB: 1 part
  Note that WB140: HMS-PP (High Melt Strength-PP) Manufactured by *Borealis* AG
  BC4BSW: Polypropylene Manufactured by Japan Polypropylene Corporation
  DF605: Ethylene-Butene Copolymer Manufactured by Mitsui Chemicals, Inc.
  PO217K: Inorganic Foaming Agent Manufactured by Dainichiseika Color and Chemicals Mfg. Co., Ltd.
  Black MB: Carbon Black Masterbatch Manufactured by Tokyo Printing Ink Mfg. Co., Ltd.
  Expansion Ratio: 1.5 to 1.8 (Specific Gravity: 0.60 to 0.50)
  Blow Pressure: 0.1 MPa In the present example, molding was performed for different weights of the instrument panel duct 1 in the simple shape as illustrated in FIG. 15 between the case of a preset flange thickness of 3.05 mm and the case of a preset flange thickness of 4.57 mm. The preset flange thickness means the thickness T between the cavities 10a, 10b of the split mold blocks 12a, 12b as illustrated in FIG. 13. A smaller weight of the instrument panel duct 1 results in greater difficulty in compression of the foamed parison between the cavities 10a, 10b. A larger weight of the instrument panel duct 1 results in greater easiness in compression of the foamed parison between the cavities 10a, 10b.

In the present example, the flange side thickness and the flange thickness of the instrument panel duct 1 were measured to calculate a value of flange thickness/flange side thickness.

The flange side thickness is the thickness A of the tube body X1 at the periphery of the point joined to the plate-shaped portion Y1 as illustrated in FIG. 9. The flange side thickness is a thickness within a range L1 of 5 mm from the point a joined to the plate-shaped portion Y1. The flange thickness is the thickness B of the plate-shaped portion Y1 in the thickness direction thereof as illustrated in FIG. 9.

Figure 1:
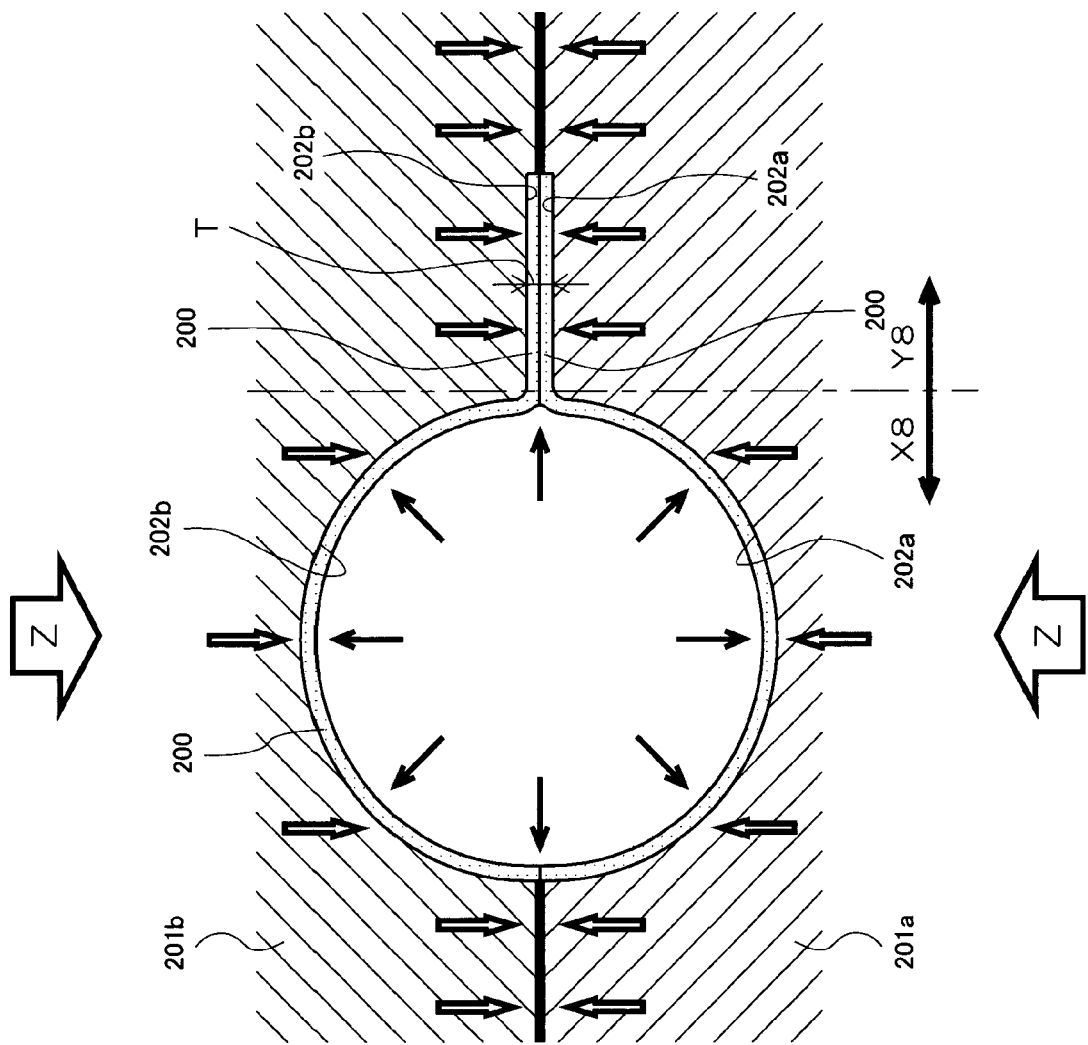
FIG. 1 is a view of a molding method example of molded foam.
Figure 2:
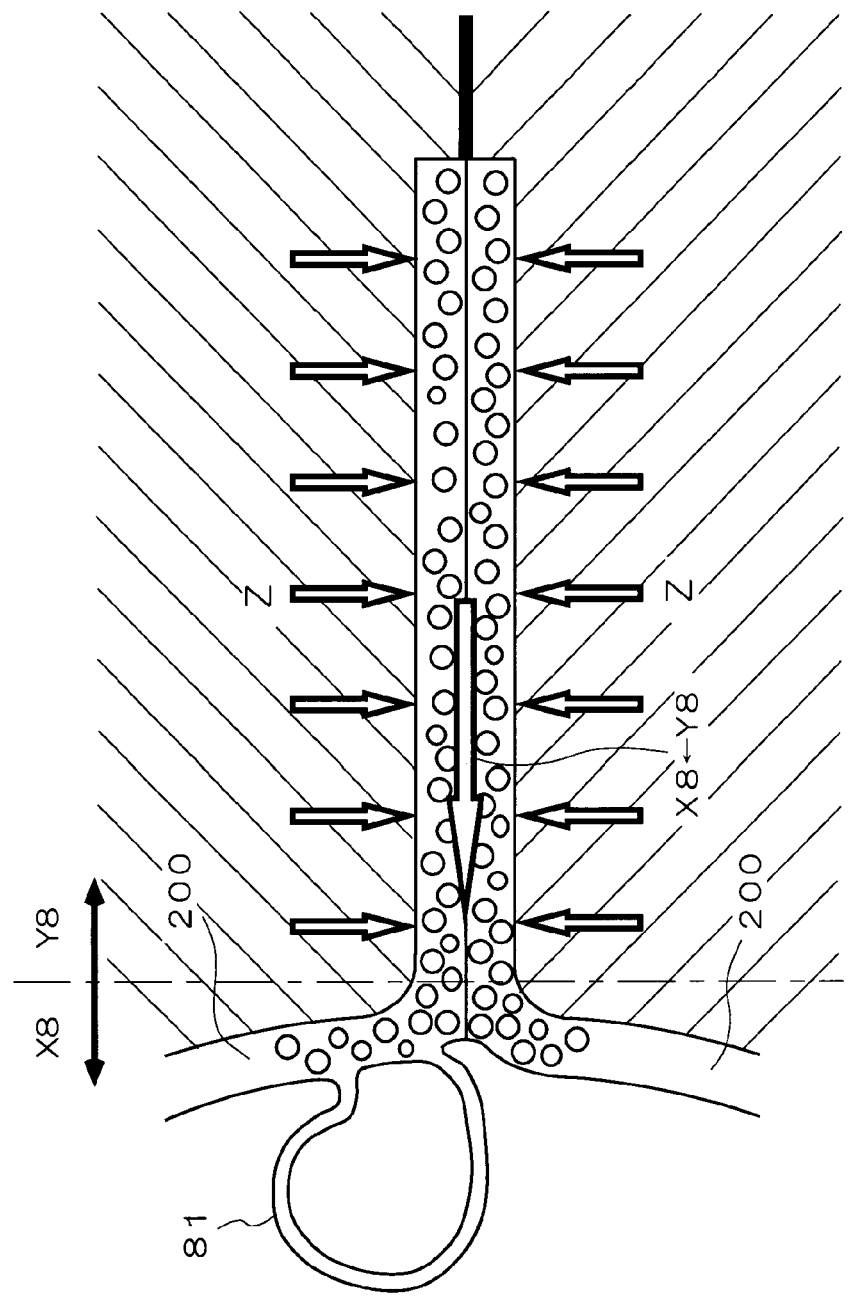
FIG. 2 is a view in the state in which a balloon-shaped cell 81 is caused on an inner surface of a tube body X8.
Figure 3:
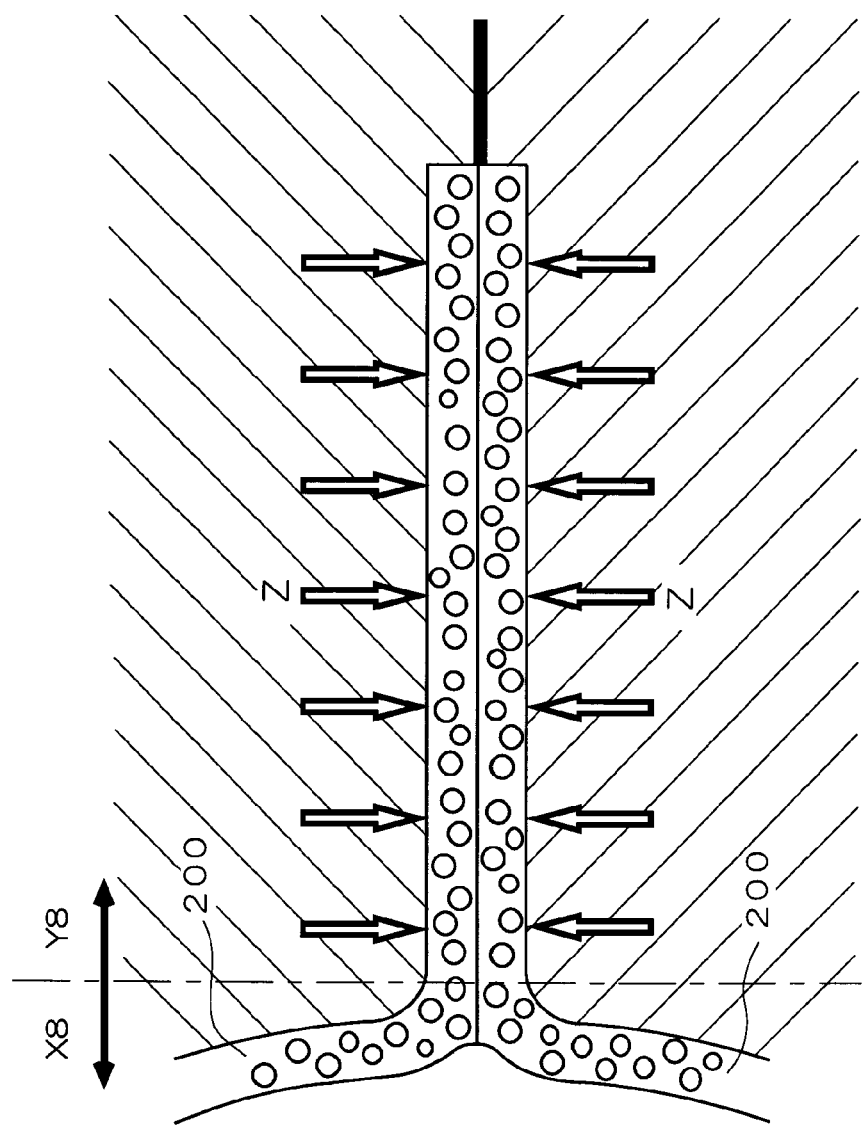
FIG. 3 is a view in the state in which portions of foamed resin 200 forming a plate-shaped portion Y8 are welded.

Moreover, for the molded instrument panel duct 1, it was examined whether or not the balloon-shaped cell 81 illustrated in FIG. 2 or the clearance 82 illustrated in FIG. 4 is caused on an inner surface of the tube body X1 and whether or not the hollow space 83 illustrated in FIG. 5 is caused in the plate-shaped portion Y1.

Examination results of the molded instrument panel duct 1 in the case of a preset flange thickness T of 3.05 mm are shown in FIG. 16. Moreover, examination results of the molded instrument panel duct 1 in the case of a preset flange thickness T of 4.57 mm are shown in FIG. 17.

In the examination results shown in FIGS. 16 and 17, the cases where the balloon-shaped cell 81 illustrated in FIG. 2, the clearance 82 illustrated in FIG. 4, and the hollow space 83 in the plate-shaped portion Y1 as illustrated in FIG. 5 are not caused were evaluated as "OK." Moreover, the cases where the balloon-shaped cell 81 illustrated in FIG. 2 is caused were evaluated as "NG1." Further, the cases where the balloon-shaped cell 81 illustrated in FIG. 2 is not caused, but there are signs of generation of the balloon-shaped cell 81 were evaluated as "BAD1." The "signs of generation of the balloon-shaped cell 81" means the state in which many cells gathered at the tube body X1 form a lump on the inner surface of the tube body X1, and then, the cells of the lump are defoamed to form a rough inner surface of the tube body X1. In addition, the cases where the clearance 82 illustrated in FIG. 4 is caused were evaluated as "NG2." Moreover, the cases where the hollow space 83 illustrated in FIG. 5 is caused were evaluated as "NG3."

The examination results of FIG. 16 show that when the value of flange thickness/flange side thickness is equal to or less than 1.40, there were signs of generation of the balloon-shaped cell 81 illustrated in FIG. 2 or the balloon-shaped cell 81 was caused. Thus, many instrument panel ducts 1 having a flange thickness/flange side thickness value of 1.43 were molded. When these samples were examined, no balloon-shaped cell 81 illustrated in FIG. 2 and no signs of generation of the balloon-shaped cell 81 were shown in any of the samples in the case of a flange thickness/flange side thickness value of 1.43. Moreover, many instrument panel ducts 1 having a flange thickness/flange side thickness value of 1.40 were molded. When these samples were examined, a plurality of the samples showed the signs of generation of the balloon-shaped cell 81. In some of the samples, the balloon-shaped cell 81 was caused.

The examination results of FIG. 17 show that when the value of flange thickness/flange side thickness is equal to or greater than 2.82, the clearance 82 illustrated in FIG. 4 or the hollow space 83 in the plate-shaped portion Y1 as illustrated in FIG. 5 was caused. Thus, many instrument panel ducts 1 having a flange thickness/flange side thickness value of 2.80 were molded. When these samples were examined, no clearance 82 illustrated in FIG. 4 and no hollow space 83 in the plate-shaped portion Y1 as illustrated in FIG. 5 was caused in any of the samples in the case of a flange thickness/flange side thickness value of 2.80. Moreover, many instrument panel ducts 1 having a flange thickness/flange side thickness value of 2.82 were molded. When these samples were examined, some of the samples showed the clearance 82 illustrated in FIG. 4 or the hollow space 83 in the plate-shaped portion Y1 as illustrated in FIG. 5.

Thus, the examination results of FIGS. 16 and 17 show that the value of flange thickness/flange side thickness needs to be greater than 1.40 and less than 2.82 in order not to cause the balloon-shaped cell 81 illustrated in FIG. 2, the clearance 82 illustrated in FIG. 4, and the hollow space 83 in the plate-shaped portion Y1 as illustrated in FIG. 5 in molding of the instrument panel duct 1 having an expansion ratio of lower than two.

Note that the balloon-shaped cell 81 illustrated in FIG. 2 and the signs of generation of the balloon-shaped cell 81 can be removed as a defective instrument panel duct 1 by checking of the inner surface of the tube body X1 in production. However, even when the inner surface of the instrument panel duct 1 is checked, the instrument panel duct 1 in which the hollow space 83 in the plate-shaped portion Y1 as illustrated in FIG. 5 is caused cannot be distinguished even by checking of the inner surface of the tube body X1. For this reason, such an instrument panel duct 1 cannot be removed as a defective instrument panel duct 1 in production. Thus, in molding of the instrument panel duct 1 having an expansion ratio of lower than two, it is essential that the value of flange thickness/flange side thickness is less than 2.82. Note that in view of mass production of the instrument panel ducts 1, it is difficult to check all inner surfaces of the tube bodies X1 in production. For this reason, in molding of the instrument panel duct 1 having an expansion ratio of lower than two, the value of flange thickness/flange side thickness is preferably greater than 1.40 and less than 2.82.

Considering that variation in the weight and specific gravity of the instrument panel duct 1 is ±15%, the value of flange thickness/flange side thickness is preferably equal to or greater than 1.70 and equal to or less than 2.40.

The plate-shaped portion Y1 is a portion to be connected with another member. For this reason, the plate-shaped portion Y1 has a desired structural strength. Thus, the value of flange thickness/flange side thickness is preferably equal to or greater than 1.80, more preferably equal to or greater than 2.0. With this configuration, the plate-shaped portion Y1 can have the desired structural strength by an increase in the flange thickness with respect to the flange side thickness. Note that in order for the plate-shaped portion Y1 to have the desired structural strength, the flange thickness is preferably equal to or greater than 4.0 mm.

The above-described examination results shown in FIGS. 16 and 17 are examination results in the case where the instrument panel duct 1 in the simple shape as illustrated in FIG. 15 is molded. However, in the case where the instrument panel duct 1 in the complicated shape as illustrated in FIG. 7 is molded, it was possible to mold the instrument panel duct 1 in which the balloon-shaped cell 81 illustrated in FIG. 2, the clearance 82 illustrated in FIG. 4, and the hollow space 83 in the plate-shaped portion Y1 as illustrated in FIG. 5 are not caused, in such a manner that the value of flange thickness/flange side thickness is set greater than 1.40 and less than 2.82.

In the case of the instrument panel duct 1 in the simple shape as illustrated in FIG. 15, the flange side thickness and the average thickness of the instrument panel duct 1 are substantially the same as each other. The average thickness means the average of thicknesses measured at an equal interval of about 100 mm in the hollow extending direction of the instrument panel duct 1. Note that the measurement positions do not include the above-described portions of the plate-shaped portion Y1, for example. However, in the case of the instrument panel duct 1 in the complicated shape as illustrated in FIG. 7, the flange side thickness and the average thickness of the instrument panel duct 1 are different from each other. For this reason, the average thickness of the complicated instrument panel duct 1 illustrated in FIG. 7 was measured, and the value of flange thickness/average thickness was calculated. As a result, it was found that when the value of flange thickness/average thickness is less than 2.0, there is a probability that the balloon-shaped cell 81 illustrated in FIG. 2 is caused. For this reason, in the instrument panel duct 1 in the simple shape as illustrated in FIG. 15, the value of flange thickness/flange side thickness (average thickness) is more preferably equal to or greater than 2.0 and equal to or less than 2.4, considering that the flange side thickness and the average thickness of the instrument panel duct 1 are substantially the same as each other.

Second Example

In a molding method similar to that of the first example, the instrument panel duct 1 in the simple shape as illustrated in FIG. 15 was molded to have an expansion ratio of 2.25 to 3.0 and a specific gravity of 0.40 to 0.30.

Examination results of the molded instrument panel duct 1 in the case of a preset flange thickness T of 3.05 mm are shown in FIG. 18. Moreover, examination results of the molded instrument panel duct 1 in the case of a preset flange thickness T of 4.57 mm are shown in FIG. 19.

In the examination results shown in FIGS. 18 and 19, the cases where the balloon-shaped cell 81 illustrated in FIG. 2, the clearance 82 illustrated in FIG. 4, and the hollow space 83 in the plate-shaped portion Y1 as illustrated in FIG. 5 are not caused were evaluated as "OK." Moreover, the cases where the balloon-shaped cell 81 illustrated in FIG. 2 is caused were evaluated as "NG1." Further, the cases where the balloon-shaped cell 81 illustrated in FIG. 2 is not caused, but there are signs of generation of the balloon-shaped cell 81 were evaluated as "BAD1." In addition, the cases where the clearance 82 illustrated in FIG. 4 is caused were evaluated as "NG2." Moreover, the cases where the hollow space 83 illustrated in FIG. 5 is caused were evaluated as "NG3."

The examination results of FIG. 18 show that when the value of flange thickness/flange side thickness is equal to or less than 1.46, there were signs of generation of the balloon-shaped cell 81 illustrated in FIG. 2 or the balloon-shaped cell 81 was caused. Thus, many instrument panel ducts 1 having a flange thickness/flange side thickness value of 1.47 were molded. When these samples were examined, no balloon-shaped cell 81 illustrated in FIG. 2 and no signs of generation of the balloon-shaped cell 81 were shown in any of the samples in the case of a flange thickness/flange side thickness value of 1.47. Moreover, many instrument panel ducts 1 having a flange thickness/flange side thickness value of 1.46 were molded. When these samples were examined, a plurality of the samples showed the signs of generation of the balloon-shaped cell 81. In some of the samples, the balloon-shaped cell 81 was caused.

The examination results of FIG. 19 show that when the value of flange thickness/flange side thickness is equal to or greater than 2.88, the clearance 82 illustrated in FIG. 4 or the hollow space 83 in the plate-shaped portion Y1 as illustrated in FIG. 5 was caused. Thus, many instrument panel ducts 1 having a flange thickness/flange side thickness value of 2.87 were molded. When these samples were examined, no clearance 82 illustrated in FIG. 4 and no hollow space 83 in the plate-shaped portion Y1 as illustrated in FIG. 5 was caused in any of the samples in the case of a flange thickness/flange side thickness value of 2.87. Moreover, many instrument panel ducts 1 having a flange thickness/flange side thickness value of 2.88 were molded. When these samples were examined, some of the samples showed the clearance 82 illustrated in FIG. 4 or the hollow space 83 in the plate-shaped portion Y1 as illustrated in FIG. 5.

Thus, the examination results of FIGS. 18 and 19 show that the value of flange thickness/flange side thickness needs to be greater than 1.46 and less than 2.88 in order not to cause the balloon-shaped cell 81 illustrated in FIG. 2, the clearance 82 illustrated in FIG. 4, and the hollow space 83 in the plate-shaped portion Y1 as illustrated in FIG. 5 in molding of the instrument panel duct 1 having an expansion ratio of equal to or higher than two.

Note that the balloon-shaped cell 81 illustrated in FIG. 2 and the signs of generation of the balloon-shaped cell 81 can be removed as a defective instrument panel duct 1 by checking of the inner surface of the tube body X1 in production. However, even when the inner surface of the instrument panel duct 1 is checked, the instrument panel duct 1 in which the hollow space 83 in the plate-shaped portion Y1 as illustrated in FIG. 5 is caused cannot be distinguished even by checking of the inner surface of the tube body X1. For this reason, such an instrument panel duct 1 cannot be removed as a defective instrument panel duct 1 in production. Thus, in molding of the instrument panel duct 1 having an expansion ratio of equal to or higher than two, it is essential that the value of flange thickness/flange side thickness is less than 2.88. Note that in view of mass production of the instrument panel ducts 1, it is difficult to check all inner surfaces of the tube bodies X1 in production. For this reason, in molding of the instrument panel duct 1 having an expansion ratio of equal to or higher than two, the value of flange thickness/flange side thickness is preferably greater than 1.46 and less than 2.88.

Considering that variation in the weight and specific gravity of the instrument panel duct 1 is ±15%, the value of flange thickness/flange side thickness is preferably equal to or greater than 1.70 and equal to or less than 2.40.

The plate-shaped portion Y1 is a portion to be connected with another member. For this reason, the plate-shaped portion Y1 has a desired structural strength. Thus, the value of flange thickness/flange side thickness is preferably equal to or greater than 1.80, more preferably equal to or greater than 2.0. With this configuration, the plate-shaped portion Y1 can have the desired structural strength by an increase in the flange thickness with respect to the flange side thickness. Note that in order for the plate-shaped portion Y1 to have the desired structural strength, the flange thickness is preferably equal to or greater than 4.0 mm.

The above-described examination results shown in FIGS. 18 and 19 are examination results in the case where the instrument panel duct 1 in the simple shape as illustrated in FIG. 15 is molded. However, in the case where the instrument panel duct 1 in the complicated shape as illustrated in FIG. 7 is molded, it was possible to mold the instrument panel duct 1 in which the balloon-shaped cell 81 illustrated in FIG. 2, the clearance 82 illustrated in FIG. 4, and the hollow space 83 in the plate-shaped portion Y1 as illustrated in FIG. 5 are not caused, in such a manner that the value of flange thickness/flange side thickness is set greater than 1.46 and less than 2.88.

In the case of the instrument panel duct 1 in the simple shape as illustrated in FIG. 15, the flange side thickness and the average thickness of the instrument panel duct 1 are substantially the same as each other. For this reason, the average thickness of the complicated instrument panel duct 1 illustrated in FIG. 7 was measured, and the value of flange thickness/average thickness was calculated. As a result, it was found that when the value of flange thickness/average thickness is less than 2.0, there is a probability that the balloon-shaped cell 81 illustrated in FIG. 2 is caused. For this reason, in the instrument panel duct 1 in the simple shape as illustrated in FIG. 15, the value of flange thickness/flange side thickness (average thickness) is more preferably equal to or greater than 2.0 and equal to or less than 2.4, considering that the flange side thickness and the average thickness of the instrument panel duct 1 are substantially the same as each other.

Note that the above-described embodiments are preferable embodiments of the present invention. The present invention is not limited to these embodiments, and may be implemented with various modifications based on the technical idea of the present invention.

The invention claimed is:
1. A molded foam tube comprising:
a tube body, and
a flange joined to an outer side of the tube body, wherein
the tube body and the flange are formed from a foamed material;
the flange has a first end and a second end;
the entire flange has a constant thickness from the first end to the second end, without a recessed groove on the flange;
the first end is joined to and integral with the tube body, and the second end is not joined to the tube body;
an expansion ratio of the foamed material is from 1.5 to 1.8; and
the flange has a thickness B, the tube body at a point peripheral to where the flange is joined has a thickness A, and a value of B:A is greater than 1.40 and less than 1.97, wherein one of the following conditions is met:
(i) the thickness A is 1.53 mm or more and 2.13 mm or less, and the thickness B is 3.01 mm or more and 3.05 mm or less;

(ii) the thickness A is 2.26 mm or more and 2.81 mm or less, and the thickness B is 4.36 mm or more and 4.43 mm or less.

* * * * *